(12) United States Patent
Fadel

(10) Patent No.: US 9,262,640 B2
(45) Date of Patent: Feb. 16, 2016

(54) CONTROLLING ACCESS TO RESOURCES BASED ON AFFINITY PLANES AND SECTORS

(71) Applicant: Charles Fadel, Boston, MA (US)

(72) Inventor: Charles Fadel, Boston, MA (US)

(*) Notice: Subject to any disclaimer, the term of this patent is extended or adjusted under 35 U.S.C. 154(b) by 308 days.

(21) Appl. No.: 13/726,064

(22) Filed: Dec. 22, 2012

(65) Prior Publication Data

US 2014/0053247 A1 Feb. 20, 2014

Related U.S. Application Data

(60) Provisional application No. 61/684,690, filed on Aug. 17, 2012.

(51) Int. Cl.
*G06F 21/60* (2013.01)
*G06F 21/30* (2013.01)
*G06F 21/40* (2013.01)

(52) U.S. Cl.
CPC .............. *G06F 21/604* (2013.01); *G06F 21/30* (2013.01); *G06F 21/40* (2013.01); *G06F 2221/2141* (2013.01)

(58) Field of Classification Search
CPC ....... G06F 21/30; G06F 21/40; G06F 21/604; G06F 2221/2141
USPC ...................................... 726/26–28; 705/319
See application file for complete search history.

(56) References Cited

U.S. PATENT DOCUMENTS

| | | | |
|---|---|---|---|
| 7,124,353 B2 | 10/2006 | Goodwin | |
| 8,402,548 B1* | 3/2013 | Muriello et al. | 726/26 |
| 8,433,656 B1* | 4/2013 | Evans et al. | 705/59 |
| 2004/0021665 A1* | 2/2004 | Branzell et al. | 345/440 |
| 2005/0197846 A1 | 9/2005 | Pezaris | |
| 2005/0197922 A1 | 9/2005 | Pezaris | |
| 2008/0046976 A1 | 2/2008 | Zuckerberg | |
| 2009/0144392 A1 | 6/2009 | Wang | |
| 2009/0265416 A1 | 10/2009 | Svendsen | |
| 2010/0161369 A1 | 6/2010 | Farrell | |
| 2011/0093506 A1 | 4/2011 | Lunt | |
| 2011/0252112 A1* | 10/2011 | Glanton | 709/217 |
| 2011/0307474 A1* | 12/2011 | Hom et al. | 707/723 |

(Continued)

OTHER PUBLICATIONS

"Bottlenose—Discover Trendfluence," downloaded Aug. 22, 2013, 2 pp. Available at: http://bottlenose.com/.

(Continued)

*Primary Examiner* — Joseph P Hirl
*Assistant Examiner* — Thomas Gyorfi
(74) *Attorney, Agent, or Firm* — Robert Plotkin, P.C.; Robert Plotkin

(57) ABSTRACT

A first person (which may be a natural person, organization, brand, or other entity) has one or more affinity planes. Each affinity plane represents a distinct closeness of relationship with the first person. The first person also has one or more sectors, each of which may be associated with a domain. Each of the other people may be associated with zero or more of the first person's affinity planes and zero or more of the first person's sectors. Each of the first person's resources may be associated with zero or more of the first person's affinity planes and zero or more of the first person's sectors. A request by one of the other people to access one of the first person's resources is granted based on the overlap between the affinity planes and sectors associated with the requestor and the affinity planes and sectors associated with the requested resource.

62 Claims, 16 Drawing Sheets

(56) References Cited

U.S. PATENT DOCUMENTS

| | | | |
|---|---|---|---|
| 2012/0047560 A1* | 2/2012 | Underwood et al. | 726/4 |
| 2012/0095976 A1 | 4/2012 | Hebenthal | |
| 2012/0157136 A1* | 6/2012 | Pitt et al. | 455/500 |
| 2013/0160072 A1* | 6/2013 | Reus et al. | 726/1 |

OTHER PUBLICATIONS

"IntroNetworks Social Networking Platform for Private Online Commun . . . ," downloaded Aug. 22, 2013, 6 pp. Available at: http://intronetworks.com/.

* cited by examiner

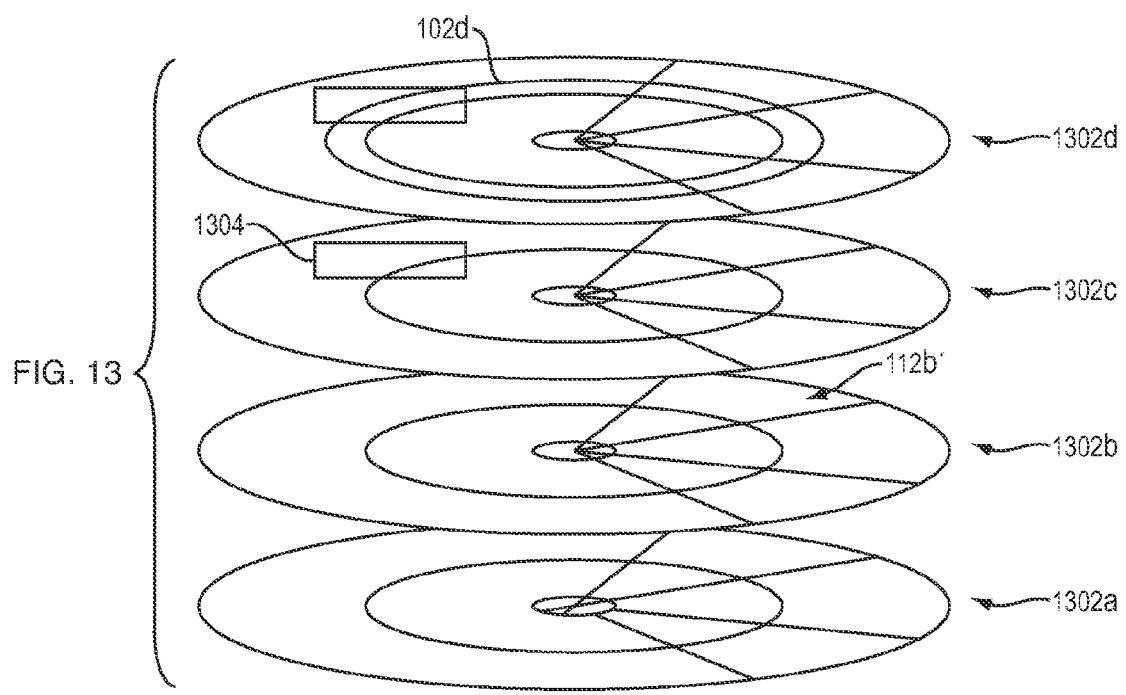

CONTROLLING ACCESS TO RESOURCES BASED ON AFFINITY PLANES AND SECTORS

CROSS-REFERENCE TO RELATED APPLICATIONS

This application claims the benefit of U.S. Prov. Pat. App. Ser. No. 61/684,690, filed on Aug. 17, 2012, entitled, "Controlling Access to Resources Based on Affinity Planes and Sectors", which is hereby incorporated by reference herein.

BACKGROUND

People use computers and computer networks to store and transmit an increasingly wide variety of information, ranging from highly sensitive medical information to photos of sporting events to corporate financial reports. Such information can vary widely not only in its content and form, but also in the extent to which its creators and owners wish to share it with others. Due to the inherent ability of computers to copy digital data quickly, easily, and with perfect accuracy, and the inherent ability of computer networks to transmit digital data to a nearly limitless number of people instantly and worldwide, in many cases the mere act of posting information on the Internet, or even of storing information on a personal computer, makes that information quickly and easily available to a larger number and wider variety of people than the poster desires. Information availability, in other words, remains largely an "all-or-nothing" proposition on the Internet.

Although various systems exist for enabling the creators and owners of digital data to exert control over the extent to which such data are made available to others, such systems have a variety of shortcomings. For example, online social networking systems, such as Facebook, enable each of their members to designate certain other people as being "within" their online social network. Once a person has designated such a group of "friends" (in Facebook parlance), the person can make certain information available through the online social networking system only to friends and not to non-friends. Although such a system represents an improvement over a true all-or-nothing system of content access control, it still has a variety of drawbacks. One such drawback is that the mere binary distinction between friends and non-friends does not enable finer-grained distinctions to be implemented by the system. This can cause significant problems when, as is commonly the case, a person allows relatively unknown acquaintances into his or her circle of friends, thereby potentially nullifying the access control-related benefits of the system.

What is needed, therefore, are improved techniques for providing people with control over access to their digital resources.

SUMMARY

Access to a first person's electronic resources by people ("connections") in the network of a first person (which may be a natural person, organization, brand, or other entity) is controlled based on relationships between the first person and the connections. In particular, one or more affinity planes are associated with the first person. Each affinity plane represents an aspect of commonality with the first person. Furthermore, one or more sectors, each of which may be associated with a domain, are associated with the first person. Each of the connections may be associated with zero or more of the first person's affinity planes and zero or more of the first person's sectors. Each of the first person's resources may be associated with zero or more of the first person's affinity planes and zero or more of the first person's sectors. Associations between the first person's connections and the first person's affinity planes and sectors may be created automatically or manually. For example, the first person may use a graphical user interface to move icons representing the first person's connections into regions representing the affinity planes and/or sectors with which those connections should be associated. Each of the first person's connections may be granted access to only those resources associated with the same affinity planes and sectors as the connection. For example, embodiments of the present invention may present a graphical user interface associated with the first person which, when rendered to of the first person's connections, is dynamically customized to present to that connection only resources associated with the same affinity planes and sectors of the first person as the connection.

For example, one embodiment of the present invention is directed to a method for use with a system. The system includes: a plurality of affinity planes associated with a first person $P_0$; a plurality of sectors associated with first person $P_0$; and data representing an association Affinity_$P_0$ ($A_0$, $P_1$) between an affinity plane $A_0$ and second person $P_1$, wherein the affinity plane $A_0$ is within the plurality of affinity planes associated with first person $P_0$; data representing an association Sector_$P_0$($S_0$, $P_1$) between a sector $S_0$ and second person $P_1$, wherein the sector $S_0$ is within the plurality of sectors associated with first person $P_0$; data representing an association Affinity_$P_0$ ($A_1$, $R_0$) between an affinity plane $A_1$ and a first resource $R_0$, wherein the affinity plane $A_1$ is within the plurality of affinity planes associated with first person $P_0$; and data representing an association Sector_$P_0$ ($S_1$, $R_0$) between a sector $S_1$ and first resource $R_0$, wherein the sector $S_1$ is within the plurality of sectors associated with first person $P_0$. The method includes: (1) determining whether affinity plane $A_0$ includes affinity plane $A_1$; (2) determining whether sector $S_0$ includes sector $S_1$; and (3) granting person $P_1$ with access to resource $R_0$ if: (a) affinity plane $A_0$ is determined to include affinity plane $A_1$; and (b) sector $S_0$ is determined to include sector $S_1$.

Another embodiment of the present invention is directed to a method including: (1) receiving first data related to a first person $P_0$; (2) analyzing the first data to identify a first closeness of relationship between the first person $P_0$ and a second person $P_1$; (3) selecting, based on the first closeness of relationship, a first affinity plane selected from a plurality of affinity planes associated with the first person $P_0$, wherein the plurality of affinity planes includes the first affinity plane, wherein the first affinity plane represents the first closeness of relationship; and a second affinity plane representing a second closeness of relationship, wherein the first closeness of relationship differs from the second closeness of relationship; and (4) associating the first affinity plane with the second person $P_1$.

Another embodiment of the present invention is directed to a method for use with a system. The system includes: a plurality of affinity planes associated with a first person $P_0$; a plurality of sectors associated with first person $P_0$; and data representing an association Sector_$P_0$($S_0$, $P_1$) between a sector $S_0$ and second person $P_1$, wherein the sector $S_0$ is within the plurality of sectors associated with first person $P_0$; data representing an association Affinity_$P_0$ ($A_1$, $R_0$) between an affinity plane $A_1$ and a first resource $R_0$, wherein the affinity plane $A_1$ is within the plurality of affinity planes associated with first person $P_0$; data representing an association Sector_$P_0$ ($S_1$, $R_0$) between a sector $S_1$ and first resource $R_0$, wherein the sector $S_1$ is within the plurality of sectors associated with first person $P_0$. The method includes: (1) determining whether sector $S_0$ includes sector $S_1$; and (2) granting person $P_1$ with access to resource $R_0$ if: sector $S_0$ is determined to include sector $S_1$.

Another embodiment of the present invention is directed to a method for use with a system. The system includes: a plurality of affinity planes associated with a first person $P_0$; a plurality of sectors associated with first person $P_0$; data representing an association Affinity_$P_0$ ($A_0$, $P_1$) between an affinity plane $A_0$ and second person $P_1$, wherein the affinity plane $A_0$ is within the plurality of affinity planes associated with first person $P_0$; data representing an association Affinity_$P_0$ ($A_1$, $R_0$) between an affinity plane $A_1$ and a first resource $R_0$, wherein the affinity plane $A_1$ is within the plurality of affinity planes associated with first person $P_0$; and data representing an association Sector_$P_0$ ($S_1$, $R_0$) between a sector $S_1$ and first resource $R_0$, wherein the sector $S_1$ is within the plurality of sectors associated with first person $P_0$. The method includes: (1) determining whether affinity plane $A_0$ includes affinity plane $A_1$; and (2) granting person $P_1$ with access to resource $R_0$ if affinity plane $A_0$ is determined to include affinity plane $A_1$.

Another embodiment of the present invention is directed to a method for use with a system. The system includes: a plurality of affinity planes associated with a first person $P_0$; a plurality of sectors associated with first person $P_0$; data representing an association Affinity_$P_0$ ($A_0$, $P_1$) between an affinity plane $A_0$ and second person $P_1$, wherein the affinity plane $A_0$ is within the plurality of affinity planes associated with first person $P_0$; data representing an association Sector_$P_0$($S_0$, $P_1$) between a sector $S_0$ and second person $P_1$, wherein the sector $S_0$ is within the plurality of sectors associated with first person $P_0$; data representing an association Sector_$P_0$ ($S_1$, $R_0$) between a sector $S_1$ and first resource $R_0$, wherein the sector $S_1$ is within the plurality of sectors associated with first person $P_0$. The method includes: (1) determining whether sector $S_0$ includes sector $S_1$; and (2) granting person $P_1$ with access to resource $R_0$ if sector $S_0$ is determined to include sector $S_1$.

Another embodiment of the present invention is directed to a method for use with a system. The system includes: a plurality of affinity planes associated with a first person $P_0$; a plurality of sectors associated with first person $P_0$; data representing an association Affinity_$P_0$ ($A_0$, $P_1$) between an affinity plane $A_0$ and second person $P_1$, wherein the affinity plane $A_0$ is within the plurality of affinity planes associated with first person $P_0$; data representing an association Sector_$P_0$($S_0$, $P_1$) between a sector $S_0$ and second person $P_1$, wherein the sector $S_0$ is within the plurality of sectors associated with first person $P_0$; and data representing an association Affinity_$P_0$ ($A_1$, $R_0$) between an affinity plane $A_1$ and a first resource $R_0$, wherein the affinity plane $A_1$ is within the plurality of affinity planes associated with first person $P_0$. The method includes: (1) determining whether affinity plane $A_0$ includes affinity plane $A_1$; and (2) granting person $P_1$ with access to resource $R_0$ if affinity plane $A_0$ is determined to include affinity plane $A_1$.

Another embodiment of the present invention is directed to a method for use with a system. The system includes: a plurality of affinity planes associated with a first person $P_0$; and affinity plane association data representing a plurality of associations between the plurality of affinity planes and a plurality of resources and people. The method includes: (1) displaying a graphical representation of each of the plurality of affinity planes, including: (a) for a first and second affinity plane in the plurality of affinity planes: (i) selecting a first location at which to display a graphical representation of the first affinity plane; (ii) displaying the graphical representation of the first affinity plane at the first location; (iii) selecting a second location at which to display a graphical representation of the second affinity plane; (iv) displaying the graphical representation of the second affinity plane at the second location; wherein (1) (a) (i) and (1) (a) (iii) comprise selecting the first and second locations such that the distance between the first and second locations is based on the number of resources and/or people in common between the first and second affinity planes.

Another embodiment of the present invention is directed to a method for use with a system. The system includes: a plurality of affinity planes associated with a first person $P_0$; and affinity plane association data representing a plurality of associations between the plurality of affinity planes and a plurality of resources and people. The method includes: (1) rendering a graphical representation of a first affinity plane in the plurality of affinity planes, comprising: (1)(a) identifying a first value of a characteristic of the first affinity plane; (1) (b) selecting a first graphical feature based on the first value of the characteristic of the first affinity plane; (1)(c) rendering the graphical representation of the first affinity plane to have the first graphical feature; (2) rendering a graphical representation of a second affinity plane in the plurality of affinity planes, comprising: (2)(a) identifying a second value of the characteristic of the second affinity plane; (2) (b) selecting a second graphical feature based on the second value of the characteristic of the second affinity plane; and (2)(c) rendering the graphical representation of the second affinity plane to have the second graphical feature. The first graphical feature differs from the second graphical feature.

Another embodiment of the present invention is directed to a method for use with a system. The system includes: a plurality of affinity planes associated with a first person $P_0$; and affinity plane association data representing a plurality of associations between the plurality of affinity planes and a plurality of resources and people. The method includes: (1) identifying, for each of a plurality of people $P_n$, an affinity contribution for person $P_n$ in relation to the first person $P_0$, based on at least one frequency of occurrence of person $P_n$ in person $P_0$'s affinity planes; (2) summing the affinity contributions for the plurality of people $P_n$ to produce an affinity total; and (3) identifying an affinity index for each of the plurality of people $P_n$ by dividing person $P_n$'s affinity contribution by the affinity total.

Other features and advantages of various aspects and embodiments of the present invention will become apparent from the following description and from the claims.

BRIEF DESCRIPTION OF THE DRAWINGS

FIG. 13 is an illustration of a graphical user interface representing a history of a person's affinity planes and sectors according to one embodiment of the present invention.

DETAILED DESCRIPTION

The continued inability of the leading online social networking systems, such as those provided by Facebook, Google, and LinkedIn, to provide their users with a flexible, fine-grained, and user-friendly system for controlling access to resources (such as documents, photographs, and videos), demonstrates the need for such a system. By default, for example, existing systems make most or all of a user's resources available to everyone within that user's online social network. Such systems, however, continue to thwart users' desires and expectations for access control, ranging from the merely annoying (as in the case where a friend who was not invited to a party sees pictures of that party) to the truly harmful (as in the case where an employer fires an employee after reading comments critical of the employer written by the employee to a co-worker).

To overcome these and other problems with the state of the art in control of online resources, embodiments of the present invention provide an intuitive, tiered system that may be used to clearly define who has access to different resources of a particular user, and when and how such access should be granted. Although embodiments of the present invention may be used as standalone systems, they are particularly useful in conjunction with existing online social networking systems, such as Facebook, LinkedIn, Second Life, Yelp, and Meetup, to name only a few. Furthermore, although embodiments of the present invention may be used to enable users to maintain their online privacy, embodiments of the present invention may be used more generally for a wide variety of purposes related to online resource access control.

For example, embodiments of the present invention are directed to techniques for enabling people to control access to their electronic resources, such as their documents, digital photographs, music, and videos. In particular, access to a first person's electronic resources by other people is controlled based on relationships between the first person and the other people. In particular, one or more affinity planes are associated with the first person. Each affinity plane represents an aspect of commonality with the first person. Furthermore, one or more sectors, each of which may be associated with a domain, are associated with the first person. Each of the other people may be associated with zero or more of the first person's affinity planes and zero or more of the first person's sectors. Each of the first person's resources may be associated with zero or more of the first person's affinity planes and zero or more of the first person's sectors. A request by one of the other people to access one of the first person's resources is granted based on the overlap between the affinity planes and sectors associated with the requestor and the affinity planes and sectors associated with the requested resource.

Figure 1A:
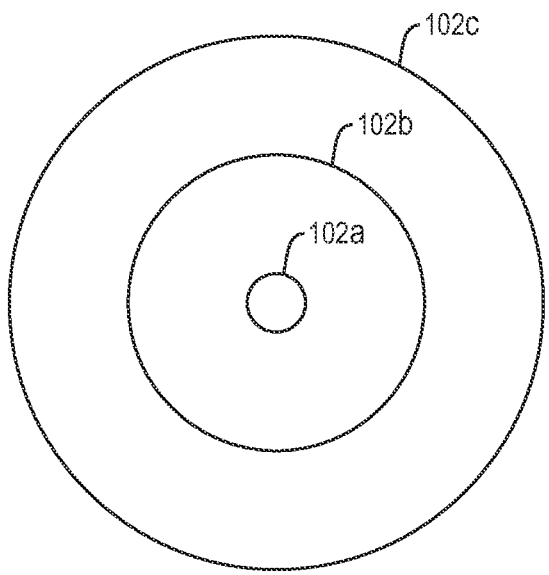
FIG. 1A is a diagram illustrating affinity planes of a first person according to one embodiment of the present invention.

For example, referring to FIG. 1A, a diagram is shown which illustrates affinity planes of a first person $P_0$. In the particular example of FIG. 1A, person $P_0$ has three affinity planes $102a$, $102b$, and $102c$. The particular number of affinity planes shown in FIG. 1A, however, is merely an example and does not constitute a limitation of the present invention. More generally, embodiments of the present invention may be used in connection with people having any number of affinity planes (including zero affinity planes). Furthermore, as will be described in more detail below, different people may have different numbers of affinity planes.

As stated above, each of person $P_0$'s affinity planes represents an aspect of commonality with person $P_0$. Each of person $P_0$'s affinity planes may, for example, represent a distinct degree of closeness of relationship with person $P_0$. For example, in FIG. 1A, affinity plane $102c$ may represent a relatively distant relationship with person $P_0$, affinity plane $102b$ may represent a closer relationship with person $P_0$ than affinity plane $102c$, and affinity plane $102a$ may represent a closer relationship with person $P_0$ than affinity plane $102b$. This hierarchy of relationships is represented in FIG. 1A by the concentric circles that represent affinity planes $102a$-$c$.

More generally, however, affinity planes may represent any type of affinity or aspect of commonality, such as social affinities (e.g., family, work, home), or domain-based affinities (e.g., music, art, sports). Each person may, for example, define his or her own affinity planes. As a result, affinity planes may, but need not, reflect any predefined concept or category, but rather may reflect a particular person's own definitions of different aspects of commonality with that person.

In the particular example of FIG. 1A, affinity plane $102a$ is fully contained within affinity plane $102b$ and affinity plane $102b$ is fully contained within affinity plane $102c$. This set of concentric relationships, however, is merely an example and does not constitute a limitation of the present invention. Alternatively, for example, affinity planes may be disjoint or overlap with each other in any of a variety of ways.

FIG. 1A merely provides a visual representation of the affinity planes $102a$-$c$ for ease of illustration and explanation. The circles that are used to represent the affinity planes $102a$-$c$ in FIG. 1A, therefore, are not the affinity planes themselves but rather merely one way in which the affinity planes $102a$-$c$ may be displayed graphically. More generally, affinity planes may be displayed and otherwise manifested in any of a variety of ways. Furthermore, affinity planes may be represented and stored using any of a variety of data structures.

A user may consider some of his or her affinity planes to be more important than others. To reflect such relative importance of different affinity planes, weights may (but need not) be associated with affinity planes. For example, each of a user's affinity planes may have a corresponding weight. The weights of the user's affinity planes may, for example, represent percentages, in which case all of the user's affinity plane weights may sum to 1.0 or 100%. The system may assign a user's affinity planes initial default weights. For example, the system may initially assign all of a user's affinity planes equal weights. As another example, the user may select a predefined set of affinity planes having predefined, but not necessarily equal, weights. The system may enable the user to manually change any one or more of the weights at any time.

In addition to or instead of weights, affinity planes may be associated with ranks. Although the ranks associated with a particular set of affinity planes may be a set of consecutive numbers (e.g., 1, 2, 3, etc.), more generally such ranks may be any set of ordered and unequal symbols. The system may assign a user's affinity planes initial default ranks, such as sequential ranks corresponding to the sequence in which the affinity planes were created. The system may enable the user to manually change any one or more of the ranks at any time.

A user may find it useful to associate both weights and ranks with affinity planes for any of a variety of reasons. For example, the user may find it useful to correlate weights with the importance of affinity planes, and to correlate ranks with the activity level within affinity planes.

Furthermore, as stated above, a person may have zero or more sectors. In general, each sector is associated with a domain, such as a topic of interest. For example, a domain may represent a topic such as music, finance, creativity, gas stations, sports, or categories, such as pictures, "likes" on Facebook or other social networking systems, movie recommendations, URLs, XML tags, and VRML tags.

Figure 1B:
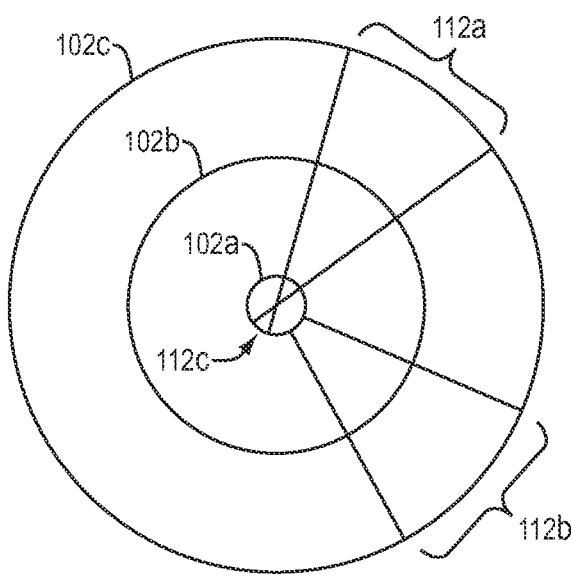
FIG. 1B is a diagram which illustrates sectors of a first person according to one embodiment of the present invention.

For example, referring to FIG. 1B, a diagram is shown which illustrates sectors of the first person $P_0$. In the particular example of FIG. 1B, person $P_0$ has three sectors $112a$, $112b$, and $112c$. The particular number of sectors shown in FIG. 1B, however, is merely an example and does not constitute a limitation of the present invention. More generally, embodiments of the present invention may be used in connection with people having any number of sectors (including zero sectors). Furthermore, as will be described in more detail below, different people may have different numbers of sectors.

As stated above, each of person $P_0$'s sectors represents a distinct domain. For example, in FIG. 1B, sector $112a$ may represent music, sector $112b$ may represent business, and sector $112c$ may represent vacations.

As illustrated by FIG. 1B, a sector may cut across (overlap) any number of affinity planes. In the example of FIG. 1B, sector $112a$ overlaps all of person $P_0$'s affinity planes (indicating that person $P_0$ is open to sharing music-related resources with people regardless of their closeness of relationship to person $P_0$), sector $112b$ overlaps only with person $P_0$'s affinity planes $102b$ and $102c$ (indicating that person $P_0$ is not open to sharing business-related resources with people who are very closely related to person $P_0$, perhaps out of a desire not to mix business with personal life), and sector $112c$ overlaps only with affinity plane $112c$ (indicating that $P_0$ is open to sharing vacation-related resources only with people to whom person $P_0$ is closely related). The particular overlaps of sectors and affinity planes shown in FIG. 1B is merely an example and does not constitute a limitation of the present invention.

Although in the example of FIG. 1B the sectors $112a$-$c$ are disjoint, this is merely an example and does not constitute a limitation of the present invention. Sectors may, for example, overlap each other or wholly contain each other.

Furthermore, although the sectors $112a$-$c$ are illustrated in FIG. 1A as wedges, and therefore are intended to convey that each of the sectors $112a$-$c$ is defined by some domain, and that the overlap of each of the sectors $112a$-$c$ with a particular one of the affinity planes $102a$-$c$ therefore includes all resources within the corresponding domain in that affinity plane, this is merely an example and does not constitute a limitation of the present invention. The area of overlap between a particular sector and a particular affinity plane may include any subset of the resources within that affinity plane. For example, the owner of a set of resources may arbitrarily associate any subset of those resources with a particular sector, in which case the visual representation of that sector may be in the form of a box, set of points, or other shape(s).

FIG. 1B merely provides a visual representation of the sectors $112a$-$c$ for ease of illustration and explanation. The wedges and partial wedges that are used to represent the sectors $112a$-$c$ in FIG. 1B, therefore, are not the sectors themselves but rather merely one way in which the sectors $112a$-$c$ may be displayed graphically. More generally, sectors may be displayed and otherwise manifested in any of a variety of ways. Furthermore, sectors may be represented and stored using any of a variety of data structures.

Associations between person $P_0$'s affinity planes and other people, and associations between person $P_0$'s sectors and other people may be created in any of a variety of ways. For example, in general, associations between a person $P_1$ and one of person $P_0$'s affinity planes or sectors may be created automatically or manually.

Figure 6:
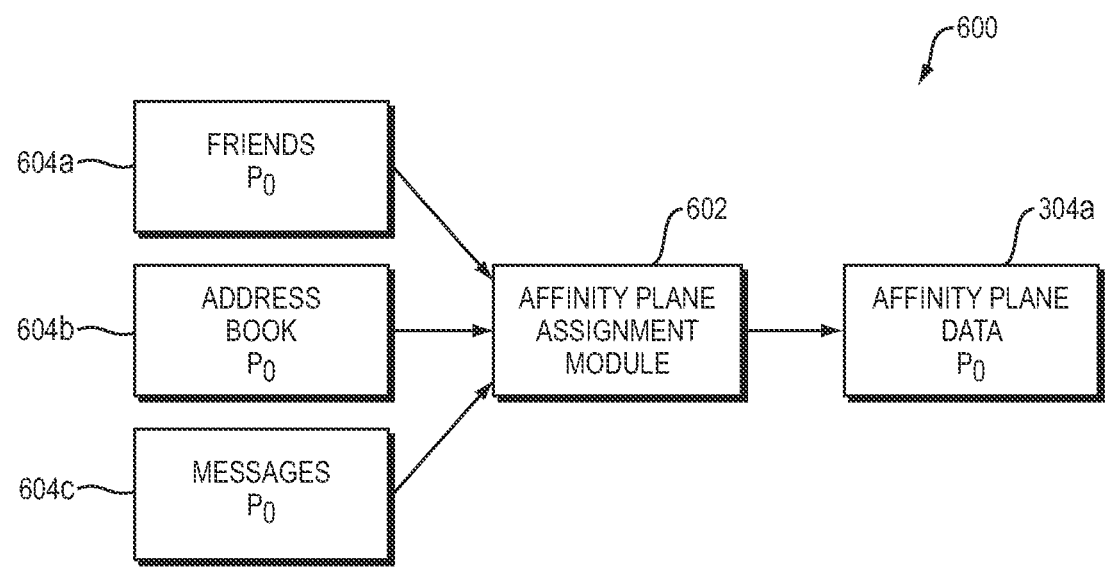
FIG. 6 is a dataflow diagram of a system for automatically assigning people to affinity planes of a first person according to one embodiment of the present invention.
Figure 7:
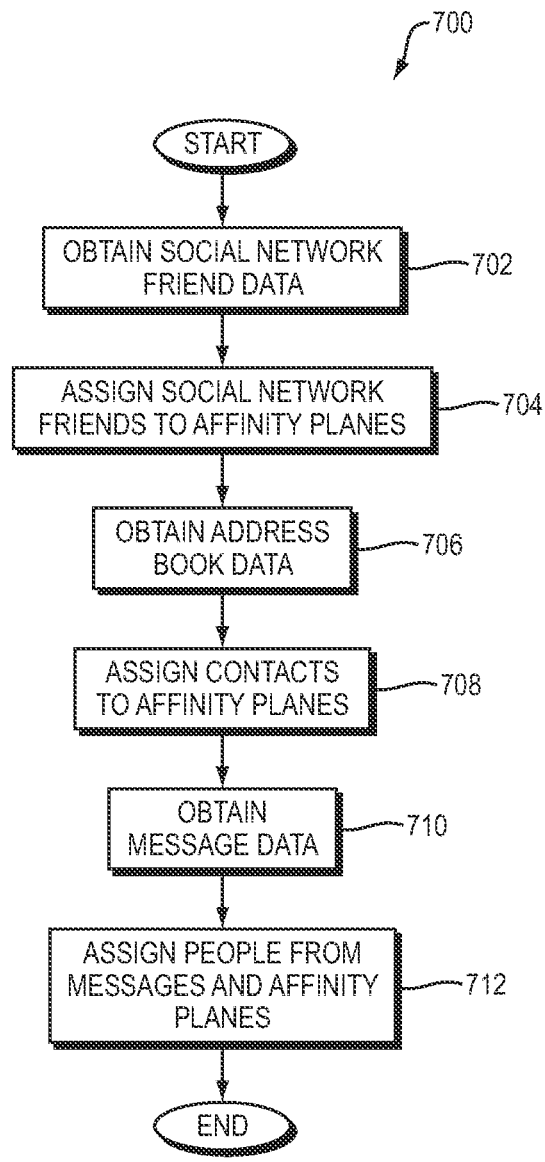
FIG. 7 is a flowchart of a method performed by the system of FIG. 6 according to one embodiment of the present invention.

Embodiments of the present invention may create such associations automatically in any of a variety of ways. For example, referring to FIG. 6, a dataflow diagram is shown of a system 600 for automatically assigning people to affinity planes of person $P_0$ according to one embodiment of the present invention. Referring to FIG. 7, a flowchart is shown of a method 700 performed by the system 600 of FIG. 6 according to one embodiment of the present invention.

In general, the system 600 includes an affinity plane assignment module 602, which receives as input data drawn from one or more data sources related to people with whom person $P_0$ has relationships (FIG. 7, operation 702). Although a few sources 604a-c of such data are shown in FIG. 6 for purposes of example, such sources 604a-c are merely examples and do not constitute limitations of the present invention. More generally, the affinity plane assignment module 602 may draw on sources other than and/or in addition to the sources 604a-c shown in FIG. 6.

The affinity plane assignment module 602 may, for example, receive as input a set of data 604a representing "friends" of person $P_0$, where the term "friends" is used herein as a shorthand for people who are deemed by some data source (e.g., one or more online social networking systems) to be within a network of person $P_0$ (FIG. 7, operation 702). Examples of people who may be represented by the friends data 604a include person $P_0$'s Facebook friends, person $P_0$'s Twitter followers, and person $P_0$'s LinkedIn connections. As these examples illustrate, the friends data 604a may include data drawn from one or more online social networking systems. As a result, and as will become clear from the description below, the system may use information about person $P_0$ from a variety of sources to create a unified definition or "federated profile" of person $P_0$'s affinity planes and sectors across all of person $P_0$'s digital networks.

The affinity plane assignment module 602 may automatically assign each of some or all of the friends represented by the friends data 604a to one or more of person $P_0$'s affinity planes (FIG. 7, operation 704). The affinity plane assignment module 602 may store data representing the association of person P0's friends with person $P_0$'s affinity planes in affinity plane-person association data 304a, which will be described in more detail in connection with FIG. 3A.

The affinity plane assignment module 602 may assign person $P_0$'s friends to person $P_0$'s affinity planes in any of a variety of ways. For example, the module 602 may assign all of person $P_0$'s friends to the same predetermined affinity plane (e.g., affinity plane 102a or 102c). As another example, the module 602 may analyze the social network graph represented by the friends data 604a (in which each node in the graph represents a person and in which each edge connecting a pair of nodes represents a "friend" relationship between the people represented by the pair of nodes) and assign friends to affinity planes based on the social network graph. For example, the module 602 may assign friends who are indicated by the friends data 604a as having a relatively close relationship to person $P_0$ to more central affinity planes than friends who are indicated by the friends data 604a as having relatively distant relationships to person $P_0$. For example, if the social network graph represented by the friends data 604a indicates that person $P_0$ has a very close relationship to person $P_1$ and a distant relationship to person $P_2$, then the module 602 may assign person $P_1$ to affinity plane 102a (FIG. 1A) and assign person $P_2$ to affinity plane 102c, since affinity plane 102a is more central than affinity plane 102c. In the case of social networking systems, such as LinkedIn, which expressly store a degree of connection between pairs of people (e.g., first degree, second degree, third degree), such a degree of connection may dictate or influence the module 602's assignment of friends to affinity planes.

As another example, the affinity plane assignment module 602 may receive as input a set of data 604b representing one or more address books of person $P_0$, such as electronic address books from installed software applications (e.g., Microsoft Outlook, Sage ACT!), cloud-based software applications (e.g., SalesForce, Google Contacts, Yahoo! Contacts), electronic address books within online social networking systems (e.g., Facebook, Twitter, LinkedIn), databases, and documents containing contact information (FIG. 7, operation 706). The address book data 604b may include any of a variety of information about one or more people other than person $P_0$, such as real name, nickname, mailing address, email address, and telephone number. As these examples illustrate, the address book data 604b may include data drawn from one or more sources.

Figure 3A:
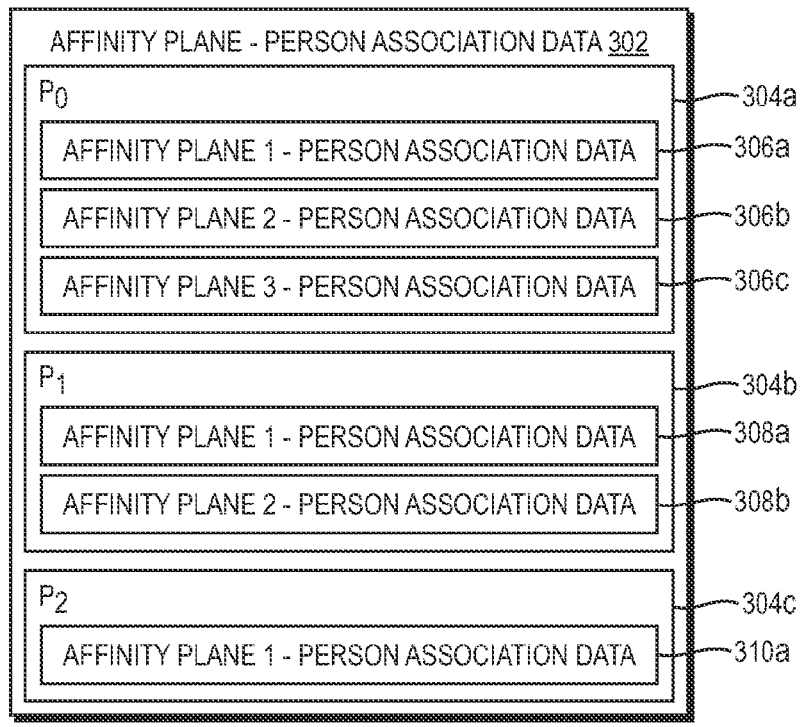
FIGS. 3A-3D are diagrams illustrating data representing relationships among affinity planes, sectors, people, and resources according to one embodiment of the present invention.

The affinity plane assignment module 602 may automatically assign each of some or all of the contacts represented by the address book data 604b to one or more of person $P_0$'s affinity planes (FIG. 7, operation 708). The affinity plane assignment module 602 may store data representing the association of person P0's contacts with person $P_0$'s affinity planes in affinity plane-person association data 304a (FIG. 3A).

The affinity plane assignment module 602 may assign person $P_0$'s contacts to person $P_0$'s affinity planes in any of a variety of ways. For example, in general, the module 602 may use any of a variety of techniques to analyze the address book data 604b and to identify, for each contact represented by the address book data 604b, a mapping between that contact's relationship with person $P_0$ and a corresponding one or more of person $P_0$'s affinity planes. For example, if person $P_0$'s affinity planes represent different degrees of closeness of relation with person $P_0$, then the module 602 may analyze the address book data 604b to identify, for each contact represented by the address book data 604b, a closeness of relationship between that contact and person $P_0$. Then the module 602 may identify, for each contact, an affinity plane of person $P_0$ that corresponds to the contact's identified closeness of relationship to person $P_0$ and assign the contact to the identified affinity plane.

The module 602 may identify a mapping between a particular contact's relationship with person $P_0$ and a corresponding one or more of person $P_0$'s affinity planes in any of a variety of ways based on the address book data 604b. For example, the module 602 may take into account any similarity between any one or more of the following characteristics between a contact and person $P_0$ when identifying a mapping between a particular contact and person $P_0$'s affinity planes: last name, home address, employer, demographic information (e.g., age, gender, nationality, religion), industry, and interests.

As another example, the affinity plane assignment module 602 may receive as input a set of data 604c representing one or more messages sent and/or received by person $P_0$ (FIG. 7, operation 710). Such messages may, for example, include any one or more of the following: email messages, text messages, voicemail messages, blog postings, web pages (e.g., web pages created, edited, or viewed by person $P_0$), and messages sent or received by person $P_0$ via an online social networking system (e.g., Facebook, Twitter, or LinkedIn). As these examples illustrate, the message data 604c may include data drawn from one or more sources.

The affinity plane assignment module 602 may automatically identify one or more people associated with the messages 604c and automatically assign each of some or all of those people to one or more of person $P_0$'s affinity planes (FIG. 7, operation 712). The affinity plane assignment module 602 may store data representing the association of people associated with the messages 604c with person $P_0$'s affinity planes in affinity plane-person association data 304a (FIG. 3A).

The module 602 may identify people associated with the messages 604c in any of a variety of ways. For example, the module 602 may identify a sender of a message, a recipient of a message, a person mentioned in a message (e.g., a person whose name appears in a message or who has been tagged as appearing in a photograph or other image), a person who has edited a message, or a person who has viewed or listened to a message as a person "associated with" the message.

The affinity plane assignment module 602 may assign the people associated with the messages 604c to person $P_0$'s affinity planes in any of a variety of ways. For example, the module 602 may create a graph of connections between person $P_0$ and people associated with the messages 604c, e.g., based on the identities of the senders and recipients of the messages 604c. The module 602 may then use any of the techniques disclosed above with respect to the social network graph of person $P_0$'s friends 604a, described above, to associate the people associated with the messages 604c to person $P_0$'s affinity planes.

As another example, the module 602 may take into account any one or more of the following to associate people associated with the messages 604c with person $P_0$'s affinity planes:
the number of messages associated with a particular person, where a larger number of messages may be interpreted as reflecting a closer relationship with person $P_0$;
the frequency of communication with a particular person, where a higher frequency may be interpreted as reflecting a closer relationship with person $P_0$;
the type of communication with a particular person (e.g., business vs. personal), where the type of communication may be mapped to a corresponding affinity plane (e.g., if a person predominantly engages in business communication with person $P_0$ then the person may be associated with person $P_0$'s "business" affinity plane);

whether a particular person is a sender or recipient of a message, where being a recipient may be interpreted as reflecting a closer relationship with person $P_0$;

whether a particular person is the sole recipient of a message or one of multiple recipients, where being a sole recipient may be interpreted as reflecting a closer relationship of the recipient with person $P_0$;

whether person $P_0$ is the sole recipient of a message or one of multiple recipients, where being a sole recipient may be interpreted as reflecting a closer relationship of the sender with person $P_0$;

how recently the message was sent, where greater recency may be interpreted as reflecting a closer relationship of the sender with person $P_0$; and whether or not the message was opened/viewed by the recipient, where an opened/viewed message may be interpreted as reflecting a closer relationship of the sender/recipient with person $P_0$ than an unopened or unviewed message.

As another example, the module 602 may take into account any content (data and/or metadata) of the messages 604c to associate people with person $P_0$'s affinity planes. Examples of such content include, but are not limited to: subject, send date, receipt date, keywords, tags (e.g., meta-tags), headers, and attachments. For example, if a particular person is the sender or recipient of a message, the module 602 may analyze the data and/or metadata of the message and assign the person to one or more of person $P_0$'s affinity planes based, at least in part, on the analysis. As one simple example, each of person $P_0$'s affinity planes may be associated with one or more keywords. The module 602 may automatically assign a person to one of person $P_0$'s affinity planes based on a function of the keywords associated with that affinity plane and the content of messages 604c associated with (e.g., sent and/or received by) the person.

Although in the examples above the module 602 associates people with affinity planes based on the data 604a, 604b, and 604c individually, this is merely an example and does not constitute a limitation of the present invention. More generally, the affinity plane module 602 may take into account any combination of two or more of the data sets 604a-c (e.g., all of the data sets 604a-c) to assign people to person $P_0$'s affinity planes. For example, to associate any particular person with one or more of person $P_0$'s affinity planes, the module 602 may take into account a combination of the person's position in person $P_0$'s social network graph as reflected in the friends data 604, the person's contact information as reflected in the address book data 604b, and the messages exchanged by the person with person $P_0$ as reflected in the message data 604c.

Furthermore, the particular data shown in FIG. 6, namely the friends data 604a, address book data 604b, and message data 604c, are merely examples of data that the affinity plane assignment module 602 may assign to affinity planes, and do not constitute limitations of the present invention. Other examples include, but are not limited to, digital images (including metadata indicating people tagged in those images), documents and other files stored in file systems, web pages and other documents stored online, databases, and any other data storage system.

The same or similar techniques as those shown in FIGS. 6 and 7 may be used to automatically assign people to sectors, such as person $P_0$'s sectors 112a-c (FIG. 1B). Furthermore, the same or similar techniques as those shown in FIGS. 6 and 7 may be used to automatically assign resources to affinity planes and sectors (e.g., person $P_0$'s affinity planes 102a-c and sectors 112a-c). Although the same general techniques may be applied to assign both people and resources to both affinity planes and sectors, the techniques (and parameters of those techniques) may vary from one case to another. For example, although textual content may be analyzed to associate people with affinity planes and to associate resources with affinity planes, different rules may be applied in each case.

The system 600 may obtain information about a user's resources, for purposes of automatically assigning those resources to affinity planes and sectors, in any of a variety of ways. For example:

the user may point the system 600 to individual resources, such as by browsing to such resources in a file system or otherwise uploading such resources to the system 600 individually;

the user may provide the system 600 with credentials for securely accessing resources from an account in another system (such as by providing the system 600 with a username and password to a social networking account), in response to which the system 600 may automatically discover resources available through the specified account;

the system 600 may include middleware and/or other components for communicating automatically with external systems (such as Facebook or other social networking systems) using technologies such as APIs, XML, or XMPP, whether or not the user provides the system for account credentials or connectivity data;

the user may provide the system 600 with a URL or other address at which resources may be accessed, in response to which the system 600 may automatically discover resources at the specified location.

Automatic discovery of resources by the system 600 may be accomplished, for example, by the systematic segmenting, parsing, analyzing (e.g., performing word recognition and/or facial recognition), or other processing of resources. As one particular example, resources may be discovered from a user's Facebook account by: (1) logging in to the user's Facebook account using the user-supplied credentials; (2) using Facebook's public APIs to download the user's friend trees, resource maps, privacy settings, post histories, and other documents; and (3) building metadata text documents for each resource, including all associated tags, people, and other resources.

The system 600 may use any of a variety of techniques to assign resources to affinity planes. In one simple example, the system 600 may index text in or otherwise associated with a resource (such as metadata associated with the resource). The system 600 may then assign the resource to one or more affinity planes based on total frequency thresholds associated with the affinity planes. For example, if a "music" affinity plane is defined by the terms "music," "band," "concert," "gig," "classical," and "rock," and the affinity plane has a total frequency threshold of 3, then a particular resource may be automatically assigned to the "music" affinity plane if terms associated with the "music" affinity plane occur within the resource at least three times in aggregate (where the number of times terms occur may include only unique occurrences or include repeat occurrences). For example, if the term "band" occurs once in the resource and the term "concert" appears twice in the resource, the aggregate number of occurrences in the resource of terms defining the "music" affinity plane would be three, and the resource would be automatically assigned to the "music" affinity plane.

Such threshold-based assignment is merely one example of a way in which resources may be automatically assigned to affinity planes. Other examples of techniques that may be used include classification methods, clustering methods (such as a Ward's method), and k-nearest neighbor algorithms.

Although the system 600 of FIG. 6 and the method 700 of FIG. 7 are described in connection with person $P_0$, the same or similar techniques may be applied to associate people and resources with the affinity planes and sectors of any additional number of people, e.g., people $P_1$, $P_2$, $P_3$, etc. Each such person may have his or her own affinity planes and sectors (although affinity planes and sectors may be shared among people). Similarly, although the affinity plane assignment module 602 may apply distinct rules (or the same rules with different parameter values) to automatically assign people and resources to the affinity planes and sectors of different people, the module may apply the same rules (with or without the same parameter values) for any two or more people.

The automatic assignment of FIGS. 6 and 7 may be replaced or supplemented by various techniques for manually assigning people and resources to affinity planes and sectors. For example, referring to FIG. 8, a dataflow diagram is shown of a system 800 for enabling a person (e.g., person $P_0$) to manually associate other people with his or her affinity planes and sectors according to one embodiment of the present invention. Referring to FIG. 9, a flowchart is shown of a method 900 that is performed by the system 800 of FIG. 8 according to one embodiment of the present invention.

Figure 8:
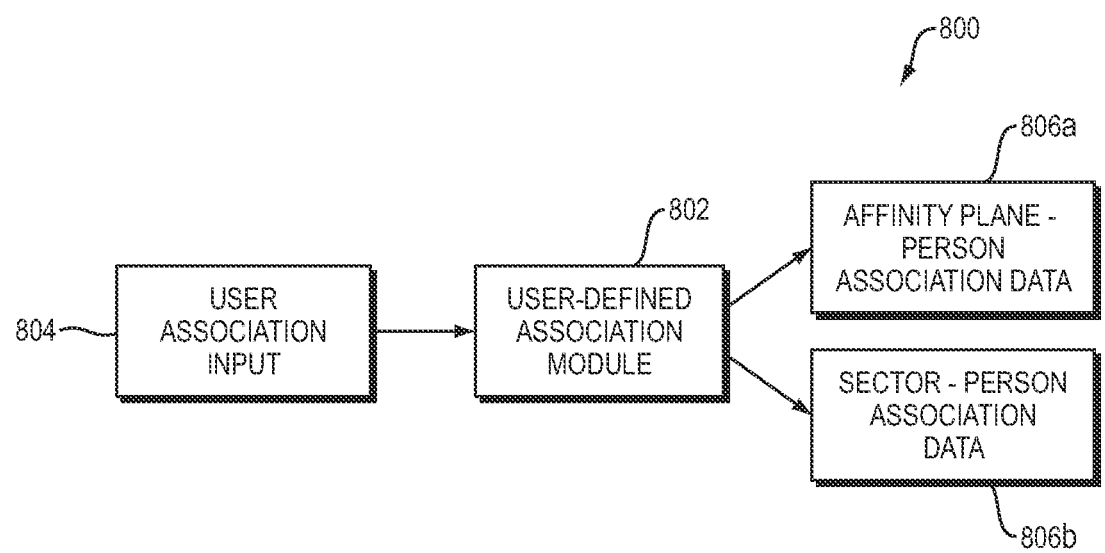
FIG. 8 is a dataflow diagram of a system for enabling a person to manually associate other people with his or her affinity planes and sectors according to one embodiment of the present invention.
Figure 9:
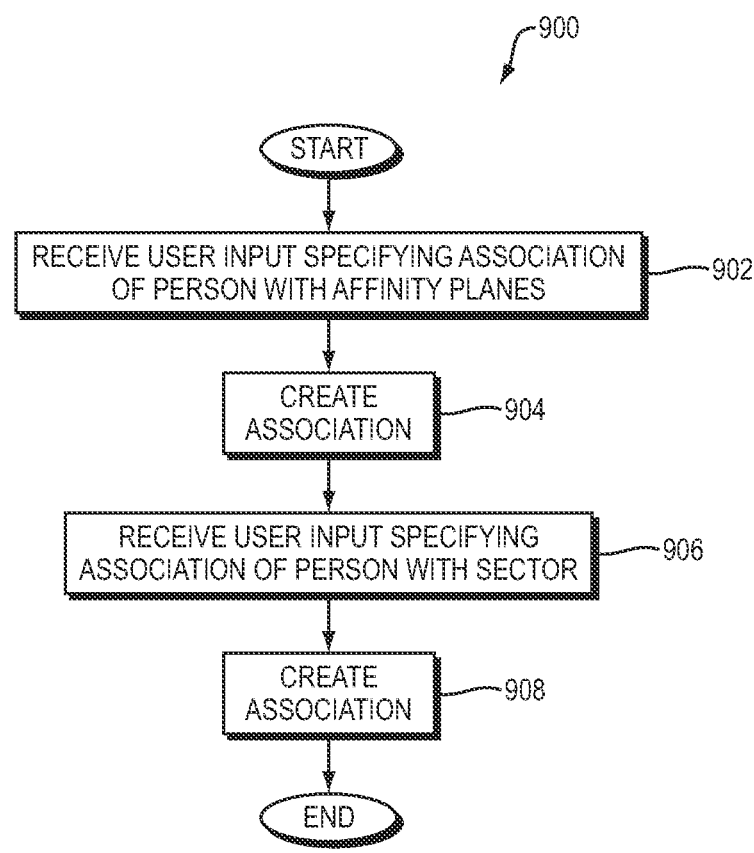
FIG. 9 is a flowchart of a method performed by the system of FIG. 8 according to one embodiment of the present invention.

The system 800 and method 900 of FIGS. 8 and 9, respectively, may be applied instead of or in addition to the system 600 and method 700 of FIGS. 6 and 7, respectively. For example, if person $P_0$ does not wish to make use of the automatic assignment of FIGS. 6 and 7, then he or she may disable such automatic assignment and assign people and resources to affinity planes and sectors solely manually using the techniques of FIGS. 8 and 9. As another example, if person $P_0$ wishes to supplement and/or correct automatic assignment of FIGS. 6 and 7, then he or she may allow the automatic assignment of FIGS. 6 and 7 to be performed, and then make manual additions and/or corrections to the results of FIGS. 6 and 7 using the techniques of FIGS. 8 and 9. For example, if the automatic assignment of FIGS. 6 and 7 automatically assign person $P_1$ to a first one of person $P_0$'s affinity planes, and person $P_0$ provides input indicating that person $P_1$ should instead be assigned to a second one of person $P_0$'s affinity planes, then the system and method of FIGS. 8 and 9 may disassociate the first of person $P_0$'s affinity planes from person $P_1$ and associate the second of person $P_0$'s affinity planes with person $P_1$. Embodiments of the present invention may then apply such a correction (or any other correction provided by person $P_0$) to future data without requiring person $P_0$ to provide further input.

Figure 10A:
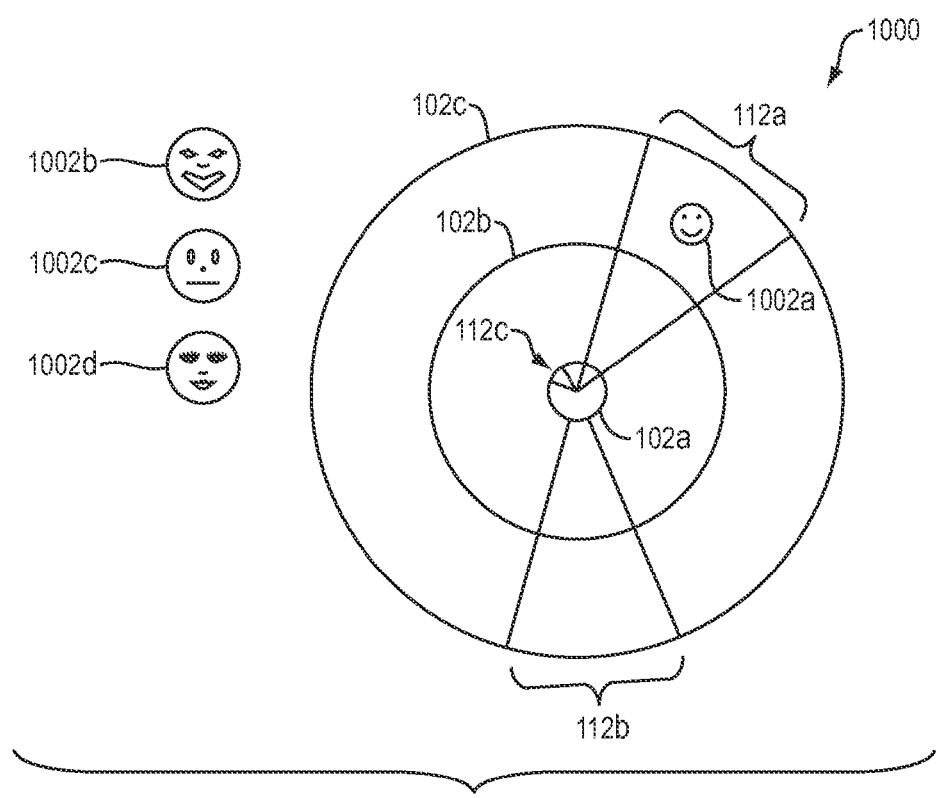
FIGS. 10A-10C are illustrations of graphical user interfaces used to associate people and resources with affinity planes and sectors according to various embodiments of the present invention.

Referring to FIG. 10A, an illustration is shown of a graphical user interface 1000 that may be used in connection with the system 800 (FIG. 8) and method 900 (FIG. 9) to associate people with affinity planes and sectors of person $P_0$. The example user interface 1000 of FIG. 10A illustrates person $P_0$'s in a manner similar to that shown in FIG. 1B. Furthermore, the user interface 1000 of FIG. 10A shows the associations between a person $P_n$ and one or more of person $P_0$'s affinity planes and sectors by showing an icon representing person $P_n$, where the icon overlaps some or all of the affinity planes and sectors associated with person $P_n$.

For example, FIG. 10A shows an icon 1002a representing a particular person $P_1$. The icon 1002a may, for example, be a digital image of the face of person $P_1$, or any other image that may be useful for recognizing the icon 1002a as representing person $P_1$. The icon 1002a is shown within both affinity plane 102c (to indicate that person $P_1$ is associated with affinity plane 102c of person $P_0$) and sector 112a to indicate that person $P_1$ is associated with sector 112a of person $P_0$. The placement of the icon 1002a shown in FIG. 10A may be the result of the automatic assignment process described above in connection with FIGS. 6 and 7, the result of manual assignment by the person $P_0$, or a combination thereof.

A user of the system 800 (such as the person $P_0$) may use the user interface 1000 to associate additional people with affinity planes and sectors of person $P_0$, to modify existing relationships between people and affinity planes and sectors of person $P_0$, and to delete such relationships. For example, the user interface 1000 also shows icons 1002b, 1002c, and 1002d, which may represent additional people $P_2$, $P_3$, and $P_4$, respectively. Such people may, for example, have been identified automatically by the process 600 of FIG. 6, such as by identifying such people from the friends list 604a, address book 604b, and/or messages 604c.

Person $P_0$ (or another user) may use the user interface 1000 to view, create, and modify associations between people $P_2$, $P_3$, and $P_4$ and affinity planes 112a-c and sectors 102a-c, such as by dragging icons 1002b-d onto the desired affinity planes and sectors. For example, referring to FIG. 10B, person $P_0$ may move icon 1002b, such as by using a mouse or other pointer device to drag icon 1002b from its starting position 1004 to a desired ending position 1008 along a path 1006. In the particular example of FIG. 10B, the desired ending position 1008 of the icon 1002b is within affinity plane 102b and sector 112b.

In response to moving the icon 1002b to its new position 1008, the system 800 may create an association between the person $P_2$ represented by icon 1002b and affinity plane 102b and sector 112b. More specifically, the system 800 may include a user-defined association module 802, the purpose of which is to enable users to define associations between people and affinity planes/sectors, and associations between resources and affinity planes/sectors.

Figure 10B:
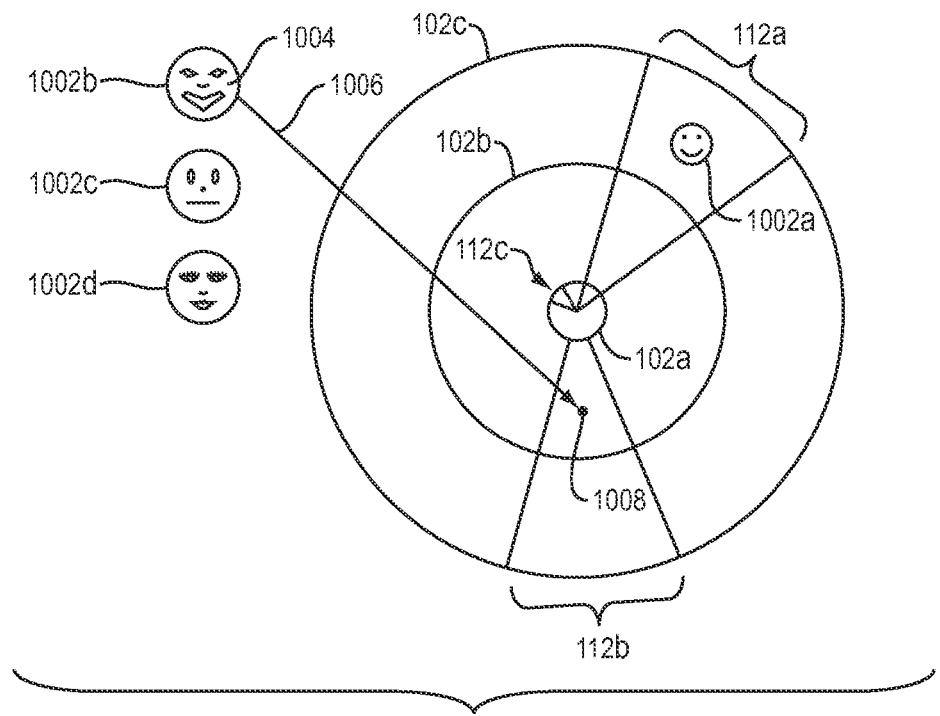

The module 802 receives input 804 specifying an association of a person with an affinity plane of another person (FIG. 9, operation 902). The drag input shown in FIG. 10B is an example of the input 804 in FIG. 8. The module 802 creates, based on the input 804, the specified association between the person and the affinity plane (FIG. 9, operation 904). The module 802 may store data representing such an association in affinity plane-person association data 806a (an example of which is affinity plane-person association data 302 in FIG. 3A).

The module 802 receives input specifying an association of the person with a sector of the other person (FIG. 9, operation 906). The drag input shown in FIG. 10B is an example of the input received in operation 906 of FIG. 9. As this example illustrates, a single input may specify both one or more affinity planes and one or more sectors. The module 802 creates, based on the input 804, the specified association between the person and the sector (FIG. 9, operation 908). The module 802 may store data representing such an association in sector-person association data 806b (an example of which is sector-person association data 312 in FIG. 3B).

The user interface 1000 may be used to create, modify, and delete any number of associations in the manner described above. For example, the user may modify an existing association by moving an icon from one position to another (e.g., by moving icon 1002b from position 1008 to a position within a different affinity plane and/or sector in the user interface 1000). As another example, the user may delete an existing association with a person by moving the person's icon out of an existing affinity plane and/or sector, and delete all existing associations with the person by moving the person's icon so that it is no longer within any affinity plane or sector. As yet another example, the user interface 1000 may be used to create or delete associations in bulk, such as by deleting all associations or all associations satisfying some criterion (such as all associations with a particular specified company).

As mentioned above, a single person may be associated with multiple affinity planes of another person. Similarly, a single person may be associated with multiple sectors of another person. Such associations may be displayed, e.g., using the user interface 1000, in any of a variety of ways. For example, a person's icon may be stretched, repeated, magnified, or otherwise enlarged so that it is contained within or otherwise overlaps with multiple affinity planes/sectors to indicate that the person is associated with the multiple affinity planes/sectors. As another example, selecting a person's icon (e.g., by clicking on or hovering over the icon) may cause the system 800 to visually indicate the affinity planes, sectors, people, or resources associated with the person, such as by displaying all such affinity planes, sectors, people, or resources in a single color, by changing a visual characteristic of such affinity planes, sectors, people, or resources (e.g., hue, brightness, transparency), by animating such affinity planes, sectors, people, or resources, or by otherwise emphasizing such affinity planes, sectors, people, or resources.

The system 800 may enable users to specify associations between a single person and multiple affinity planes/sectors in any of a variety of ways. For example, when a user moves a person's icon into a particular affinity plane, the system 800 may by default associate the person only with that affinity plane. When a user moves a person's icon into a particular sector, the system 800 may by default associate the person with that sector in all affinity planes. These default rules are merely examples. The system administrator and/or user may define other default rules to be applied in such cases.

One way in which the system 800 may enable a user to indicate that a person should be associated with multiple affinity planes/sectors is to enable the user to expand the person's icon across the multiple affinity planes/sectors. As another example, the system 800 may enable the user to make multiple copies of the person's icon and to position those copies within each of the desired affinity planes/sectors. As another example, the system 800 may enable the user to place the person's icon into a single affinity plane and sector, but then to execute other commands to select additional affinity planes/sectors with which to associate the person (e.g., by clicking a mouse cursor on the other affinity planes/sectors).

In addition to or instead of such techniques, the system 800 may apply rules to create, modify, or delete associations between people and affinity planes/sectors. Such rules may include system rules and rules defined by individual users. For example, person $P_0$ may define rules that the system 800 applies only to associations between other people and person $P_0$'s affinity planes/sectors, while person $P_1$ may define a different set of rules that the system 800 applies only to associations between other people and person $P_1$'s affinity planes/sectors. The system 800 may, in such a case, still apply a single set of system-applicable rules to both person $P_0$ and person $P_1$.

An example of such a rule is the following: if an association is created between person $P_n$ and a sector of person $P_0$, then the association spans all affinity planes of person $P_0$. Another example of such a rule is the following: if an association is created between person $P_n$ and an affinity plane $A_m$ of person $P_0$, then the association spans all affinity planes of person $P_0$ that contain affinity plane $A_m$. For example, returning to FIG. 10A, if an association is created by placing icon 1002b into affinity plane 102a, then this association may span both affinity plane 102a and enclosing affinity planes 102b and 102c. Conversely, if an association is created between a resource and an affinity plane 102c, then this association may span both affinity plane 102c and all of the affinity planes enclosed by it (i.e., affinity planes 102a-b). Such spanning of affinity planes may be implemented in a variety of ways, such as by creating distinct associations for each of the affinity planes 102a, 102b, and 102c, or by applying the rule dynamically whenever the associations are retrieved. In the latter case, if person $P_0$ adds an additional affinity plane 102d that enclosed affinity plane 102c, then the person associated with icon 1002b will automatically be associated with the new affinity plane 102d.

Although in the examples described above, affinity planes overlap (e.g., enclose) each other, this is merely an example and does not constitute a limitation of the present invention. For example, any two of a person's affinity planes may partially overlap each other, without either fully enclosing the other. As another example, any two of a person's affinity planes may be disjoint. As a result, a user may have two or more "parallel universes" of affinity planes and sectors, such as one that is dedicated to business relationships and another that is dedicated to personal relationships. Each such universe may be disjoint from the other, or overlap to any degree.

Although the example of FIGS. 8-10 is shown as applying specifically to people, the same or similar techniques may be used to create, modify, and delete associations between resources and affinity planes/sectors. For example, the graphical user interface 1000 (or another graphical user interface) may display icons representing individual resources. A user (e.g., person $P_0$) may drag those icons into affinity planes/sectors and thereby cause the system 800 to create associations between the corresponding resources and the specified affinity planes/sectors in the manner described above. Icons representing both people and resources, and the affinity planes/sectors with which they are associated, may be displayed simultaneously within the same user interface 1000, thereby facilitating the user's understanding of the relationship between person $P_0$ and his or her resources, connections (related people), affinity planes, and sectors.

Although the examples of FIGS. 6-10 are described above as illustrating techniques for granting resource access to people, the same or similar techniques may be used, additional or alternatively, to restrict or deny resource access to people. For example, the techniques of FIGS. 6-10 may be used to explicitly grant resource access to certain people and, by negative implication, to deny resource access to other people who have not expressly been granted access. As another example, the techniques of FIGS. 6-10 may be used to explicitly restrict or deny access to certain people. For example, the automatic assignment system 600 of FIG. 6 may be used to automatically deny access by certain people to one or more affinity planes and/or one or more sectors of another person. Similarly, the manual assignment system 800 of FIG. 8 may be used to enable a person to manually deny access by certain people to one or more affinity planes and/or one of more sectors of that person. For example, the user interface 1000 of FIGS. 10A-10B may be used to manually specify affinity planes and/or sectors to which specified people should be denied access.

Figure 10C:
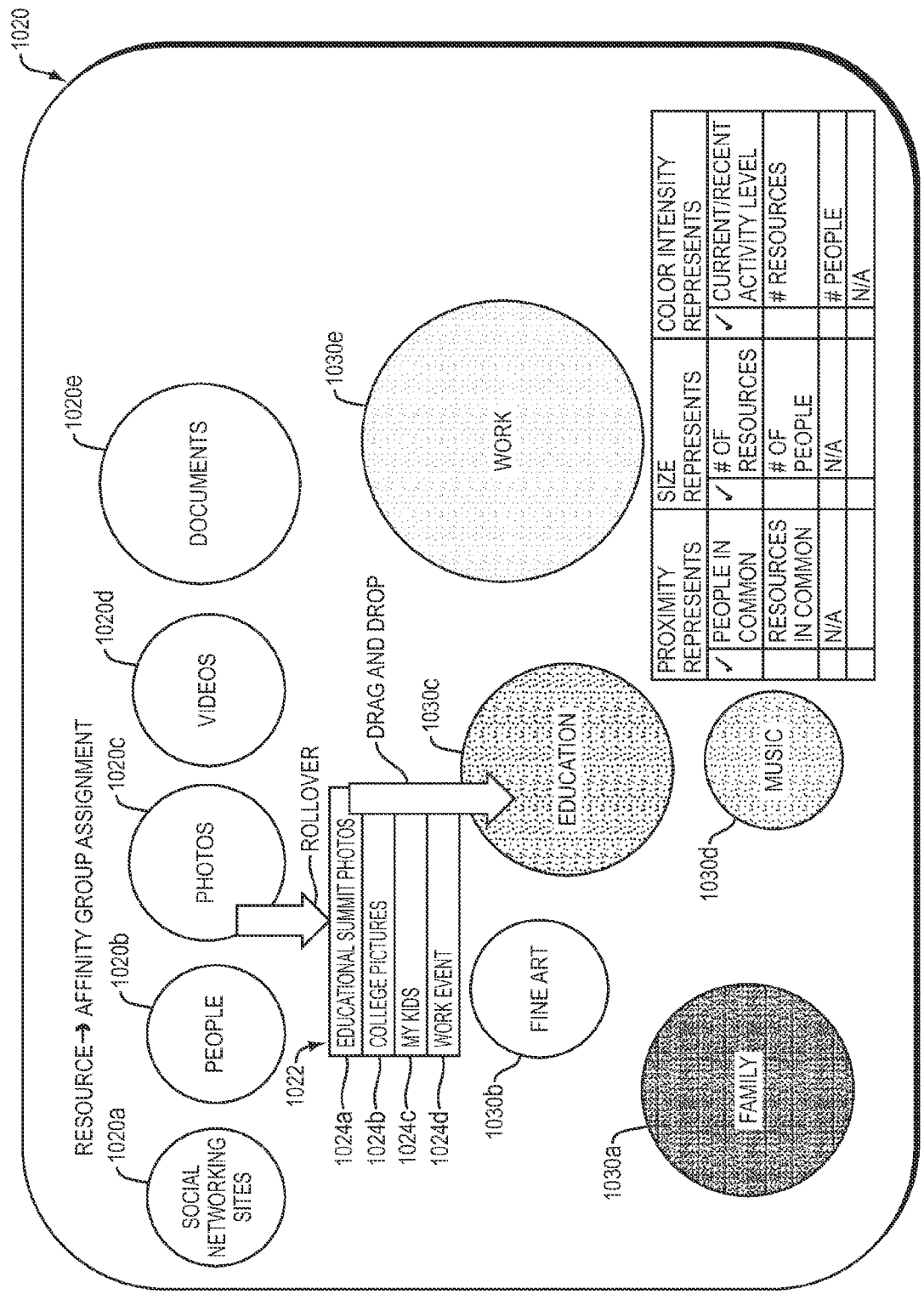

The particular user interfaces shown in FIGS. 10A-10B are merely examples and do not constitute limitations of the present invention. FIG. 10C shows another example user interface 1010 that may be used to assign resources of a particular person $P_0$ to that person's affinity planes. The user interface 1010 includes circles 1020a-e, each of which represents a different type of resource of person $P_0$, namely social networking sites 1020a, people 1020b, photos 1020c, videos 1020d, and documents 1020e. These particular types of resource are merely examples and do not constitute limitations of the present invention. The size of each of the circles 1020a-e corresponds to the number of resources in the corresponding category.

The user interface 1010 also includes circles 1030a-e, each of which represents a different affinity plane of person $P_0$, namely a family affinity plane 1030a, a fine art affinity plane 1030b, an education affinity plane 1030c, a music affinity plane 1030d, and a work affinity plane 1030e. These particular affinity planes are merely examples and do not constitute limitations of the present invention. The size of each of the circles 1030a-e may, for example, correspond to the number of resources in the corresponding affinity plane, the importance (e.g., weight and/or rank) of the affinity plane, or a combination thereof. Each of the circles 1030a-e, in other words, is a graphical representations of one of person $P_0$'s affinity planes.

It should be appreciated that embodiments of the present invention may generate the user interface 1010 of FIG. 10C in a variety of ways. For example, for each of a plurality of affinity planes of person $P_0$, embodiments of the present invention may: (1) select a location at which to display a graphical representation of the affinity plane; and (2) display the graphical representation of the affinity plane at the selected location. Graphical representations of different affinity planes may be displayed at different locations. The distance between any pair of graphical representations may be based on the number of resources and/or people in common between the affinity planes represented by the pair of graphical representations. As this description implies, and as illustrated by the example of FIG. 10C, the resulting user interface may include graphical representations of affinity planes (e.g., circles) that are separated from each other by multiple distances that differ from each other.

Embodiments of the present invention may represent characteristics of affinity planes using graphical features instead of or in addition to size, such as color and/or shape. For example, for each of a plurality of affinity planes of person $P_0$, embodiments of the present invention may: (1) identify a value of a characteristic of the affinity plane; (2) select a graphical feature based on the value of the characteristic of the affinity plane; and (3) render a graphical representation of the affinity plane to have the selected graphical feature. Examples of characteristics are the number of people associated with an affinity plane, the number of resources associated with an affinity plane, and the current activity level associated with an affinity plane. Such a characteristic may have one value (e.g., 10) for one affinity plane and a different value (e.g., 20) for another affinity plane. Examples of graphical features are size, shape, and color. As a result, affinity planes having different values of the same characteristic may be rendered using different graphical features, such as different sizes, shapes, or colors.

The user (e.g., person $P_0$ or another person) may use the interface 1010 to assign resources to affinity planes in any of a variety of ways. In general, the user may drag one of the resource circles 1020a-e onto one of the affinity plane circles 1030a-e to assign the corresponding resources to the corresponding affinity plane. If the user wishes to assign only a subset of the resources corresponding to a particular one of the circles 1020a-e to an affinity plane, the user may select a circle (e.g., by clicking on or hovering over the circle), thereby causing the user interface 1010 to display a list of subsets of the selected resource, as in the example of resource subset list 1022, which contains descriptions of subsets of the photo resources 1020c (namely, educational summit photos 1024a, college pictures 1024b, my kids' pictures 1024c, and work event pictures 1024d). The user may select one of the subsets from the list 1022, thereby causing the user interface 1010 to assign only the selected subset of photos to the selected affinity plane.

Once a person's connections and resources have been associated with the person's affinity planes and sectors (whether automatically, manually, or both), embodiments of the present invention may be used to grant or deny access to those resources by other people based on the associations. Before explaining how such access control may be implemented, ways in which the associations among connections (people), resources, affinity planes, and sectors may be implemented will be described.

Figure 2:
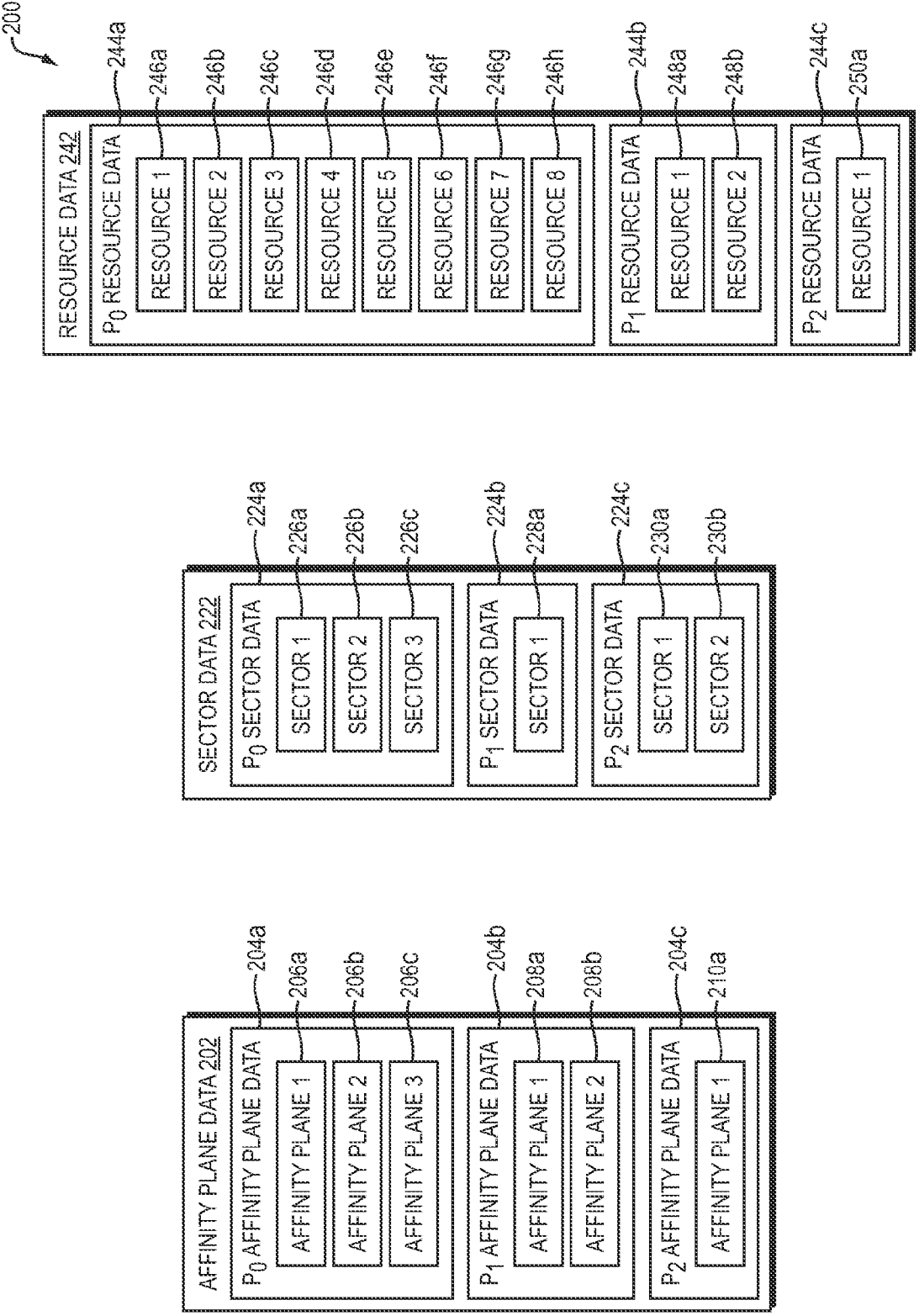
FIG. 2 is a diagram illustrating an example of a system containing affinity plane data according to one embodiment of the present invention.

For example, referring to FIG. 2, an example of a system 200 implemented according to one embodiment of the present invention is shown. The system 200 includes affinity plane data 202 representing affinity planes of users of the system 200. For purposes of example, the affinity plane data 202 includes affinity plane data 204a for person $P_0$, affinity plane data 204b for a second person $P_1$, and affinity plane data 204c for a third person $P_0$. The number of users and affinity planes illustrated in FIG. 2 is merely an example and does not constitute a limitation of the present invention, which may be applied to any number of users, each of whom may have any number of affinity planes.

In the particular example of FIG. 2, person $P_0$'s affinity plane data 204a includes first affinity plane definition data 206a defining a first one of person $P_0$'s affinity planes (e.g., affinity plane 102a in FIG. 1A), second affinity plane definition data 206b defining a second one of person $P_0$'s affinity planes (e.g., affinity plane 102b in FIG. 1A), and third affinity plane definition data 206c defining a third one of person $P_0$'s affinity planes (e.g., affinity plane 102b in FIG. 1A). Similarly, person $P_1$'s affinity plane data 204b includes first affinity plane definition data 208a defining a first one of person $P_1$'s affinity and second affinity plane definition data 208b defining a second one of person $P_1$'s affinity planes. Finally, person $P_2$'s affinity plane data 204c includes first affinity plane definition data 210a defining a first one of person $P_2$'s affinity planes.

As FIG. 2 illustrates, the term "a person's affinity planes" may refer to any affinity planes that are associated with that person by the use of suitable data. Any reference herein to a particular person "having" affinity planes or to the affinity planes "of" a particular person should be understood to refer to the particular person's affinity planes. For example, reference herein to "person $P_0$'s affinity planes" or to the fact that "person $P_0$ has three affinity planes" or to the "affinity planes of person $P_0$" should be understood to refer to the person $P_0$'s affinity planes as defined by the affinity plane data 204a in FIG. 2. As further illustrated by FIG. 2, different people may have different affinity planes, and different people may have different numbers of affinity planes.

For example, referring again to FIG. 2, the system 200 includes sector data 222 representing sectors of users of the system 200. For purposes of example, the sector data 222 includes sector data 224a for person $P_0$, sector data 224b for second person $P_1$, and sector data 224c for third person $P_0$. The number of sectors illustrated in FIG. 2 is merely an example and does not constitute a limitation of the present invention, which may be applied to users having any number of sectors.

In the particular example of FIG. 2, person $P_0$'s sector data 224a includes first sector definition data 226a defining a first one of person $P_0$'s sectors (e.g., sector 112a in FIG. 1B), second sector definition data 226b defining a second one of person $P_0$'s sectors (e.g., sector 112b in FIG. 1B), and third sector definition data 226c defining a third one of person $P_0$'s sectors (e.g., sector 102c in FIG. 1B). Similarly, person $P_1$'s sector data 204b includes first sector definition data 228a defining a first one of person $P_1$'s sectors. Finally, person $P_2$'s sector data 224c includes first sector definition data 230a defining a first one of person $P_2$'s sectors and second sector definition data 230b defining a second one of person $P_2$'s sectors.

As FIG. 2 illustrates, the term "a person's sectors" may refer to any sectors that are associated with that person by the use of suitable data. Any reference herein to a particular person "having" sectors or to the sectors "of" a particular person should be understood to refer to the particular person's sectors. For example, reference herein to "person $P_0$'s sectors" or to the fact that "person $P_0$ has three sectors" or to the "sectors of person $P_0$" should be understood to refer to the person $P_0$'s sectors as defined by the sector data 224a in FIG. 2. As further illustrated by FIG. 2, different people may have different sectors, and different people may have different numbers of sectors.

As illustrated in FIG. 1B, a sector need not cut across (overlap) all affinity planes. For example, although sector 112a overlaps all of person $P_0$'s affinity planes, sector 112b overlaps only affinity planes 102b and 102c, but not affinity plane 102a. As another example, sector 112c overlaps only affinity plane 102a but not affinity planes 102b or 102c. The extent to which a particular sector of a particular person overlaps that person's affinity planes may be specified within the sector definition data for that sector. For example, each instance of sector definition data may have an "associated affinity planes" field which specifies the affinity plane(s), if any, that overlap with the corresponding sector. Such a field may, for example, specify a list of affinity planes or specify the associated affinity plane(s) in a more general way, such as by using a filter specifying one or more criteria, or a label such as "All" or "None." For example, the sector definition data 226a for sector 112a may contain a value of "all" to specify that the sector 112a overlaps all of person $P_0$'s affinity planes; the sector definition data 226b for sector 112b may contain a value of $\{2, 3\}$ to specify that the sector 112b overlaps only affinity planes 102b and 102c; and the sector definition data 226c for sector 112c may contain a value of $\{1\}$ to specify that the sector 112c overlaps only affinity plane 112c.

As mentioned above, people may be associated with other people's affinity planes. This is one way in which embodiments of the present invention may be used to control access to a person's resources. For example, if a second person $P_1$ is associated with person $P_0$'s affinity plane 102c but not with person $P_0$'s affinity planes 102a-b, this may be taken into account when deciding whether to grant person $P_1$ with access to person $P_0$'s resources. Ways in which the association of people with other people's affinity planes may be used to grant or deny resource access requests will be described in more detail below.

In general, any particular person may be associated with zero, one, or more of another person's affinity planes. For example, referring to FIG. 3A, an example is shown of affinity plane person association data 302 according to one embodiment of the present invention. In general, the data 302 specifies, for each of a plurality of people (e.g., people $P_0$, $P_1$, and $P_2$), the other people who are associated with their affinity planes.

More specifically, affinity plane person association data 302 includes data 304a, 304b, and 304c, corresponding to people $P_0$, $P_1$, and $P_2$, respectively. For example, affinity plane person association data 304a specifies which other people are associated with person $P_0$'s affinity planes, affinity plane person association data 304b specifies which other people are associated with person $P_1$'s affinity planes, and affinity plane person association data 304c specifies which other people are associated with person P2's affinity planes. More specifically, person $P_0$'s affinity plane person association data 304a includes data 306a, which specifies which other people are associated with affinity plane 102a, data 306b, which specifies which other people are associated with affinity plane 102b, and data 306c, which specifies which other people are associated with affinity plane 102c. Person $P_1$'s affinity plane person association data 304b includes data 308a, which specifies which other people are associated with a first one of person $P_1$'s affinity planes, and data 308b, which specifies which other people are associated with a second one of person $P_1$'s affinity planes. Finally, person $P_2$'s affinity plane person association data 304c includes data 310a, which specifies which other people are associated with a first one of person $P_2$'s affinity planes.

As mentioned above, people may be associated with other people's sectors. This is one way in which embodiments of the present invention may be used to control access to a person's resources. For example, if a second person $P_1$ is associated with person $P_0$'s sector 112c but not with person $P_0$'s sectors 112a-b, this may be taken into account when deciding whether to grant person $P_0$ with access to person $P_0$'s resources. Ways in which the association of people with other people's sectors may be used to grant or deny resource access requests will be described in more detail below.

In general, any particular person may be associated with zero, one, or more of another person's sectors. For example, referring to FIG. 3B, an example is shown of sector-person association data 312 according to one embodiment of the present invention. In general, the data 312 specifies, for each of a plurality of people (e.g., people $P_0$, $P_1$, and $P_2$), the other people who are associated with their sectors.

More specifically, sector-person association data 312 includes data 314a, 314b, and 314c, corresponding to people $P_0$, $P_1$, and $P_2$, respectively. For example, sector-person association data 314a specifies which other people are associated with person $P_0$'s sectors, sector-person association data 314b specifies which other people are associated with person $P_1$'s sectors, and sector-person association data 314c specifies which other people are associated with person $P_2$'s sectors. More specifically, person $P_0$'s sector-person association data 314a includes data 316a, which specifies which other people are associated with sector 112a, data 316b, which specifies which other people are associated with sector 112b, and data 316c, which specifies which other people are associated with sector 112c. Person $P_1$'s sector-person association data 314b includes data 318a, which specifies which other people are associated with a first one of person $P_1$'s sectors. Finally, person $P_2$'s sector-person association data 314c includes data 320a, which specifies which other people are associated with a first one of person $P_2$'s sectors, and data 320b, which specifies which other people are associated with a second one of person $P_2$'s sectors.

Figure 3B:
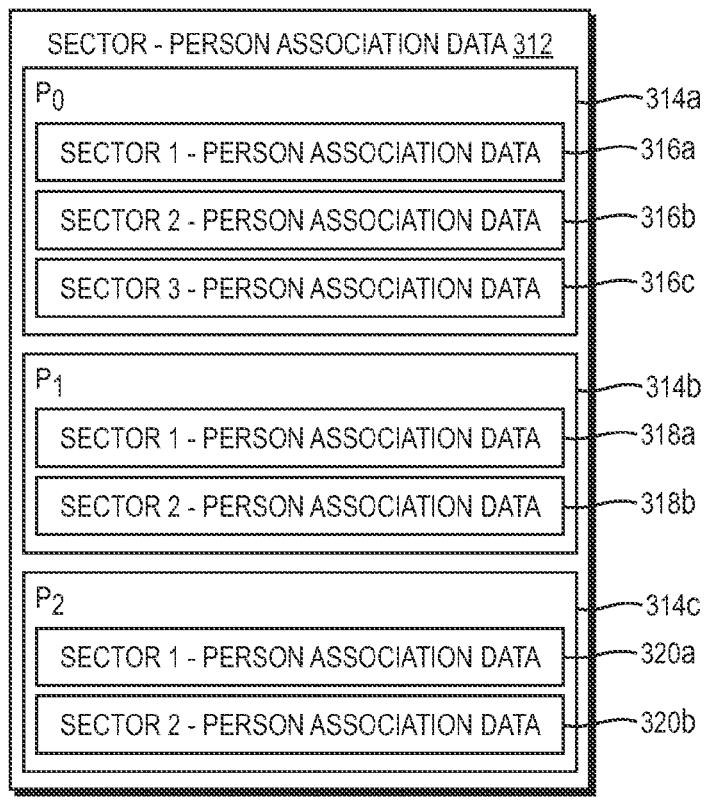

Although the affinity plane association data 302 of FIG. 3A and the sector association data 312 of FIG. 3B are shown as distinct data in FIGS. 3A and 3B, this is merely an example and does not constitute a limitation of the present invention. The data 302 and 312 may be combined together and/or divided in any of a variety of ways.

As mentioned above, a person may have zero or more resources. For example, referring to FIG. 1C, a diagram is shown which illustrates resources of first person $P_0$. In the particular example of FIG. 1C, person $P_0$ has eight resources 122a-h. The particular number of resources shown in FIG. 1C, however, is merely an example and does not constitute a limitation of the present invention. More generally, embodiments of the present invention may be used in connection with people having any number of resources (including zero resources). Furthermore, as will be described in more detail below, different people may have different numbers of resources.

Figure 1C:
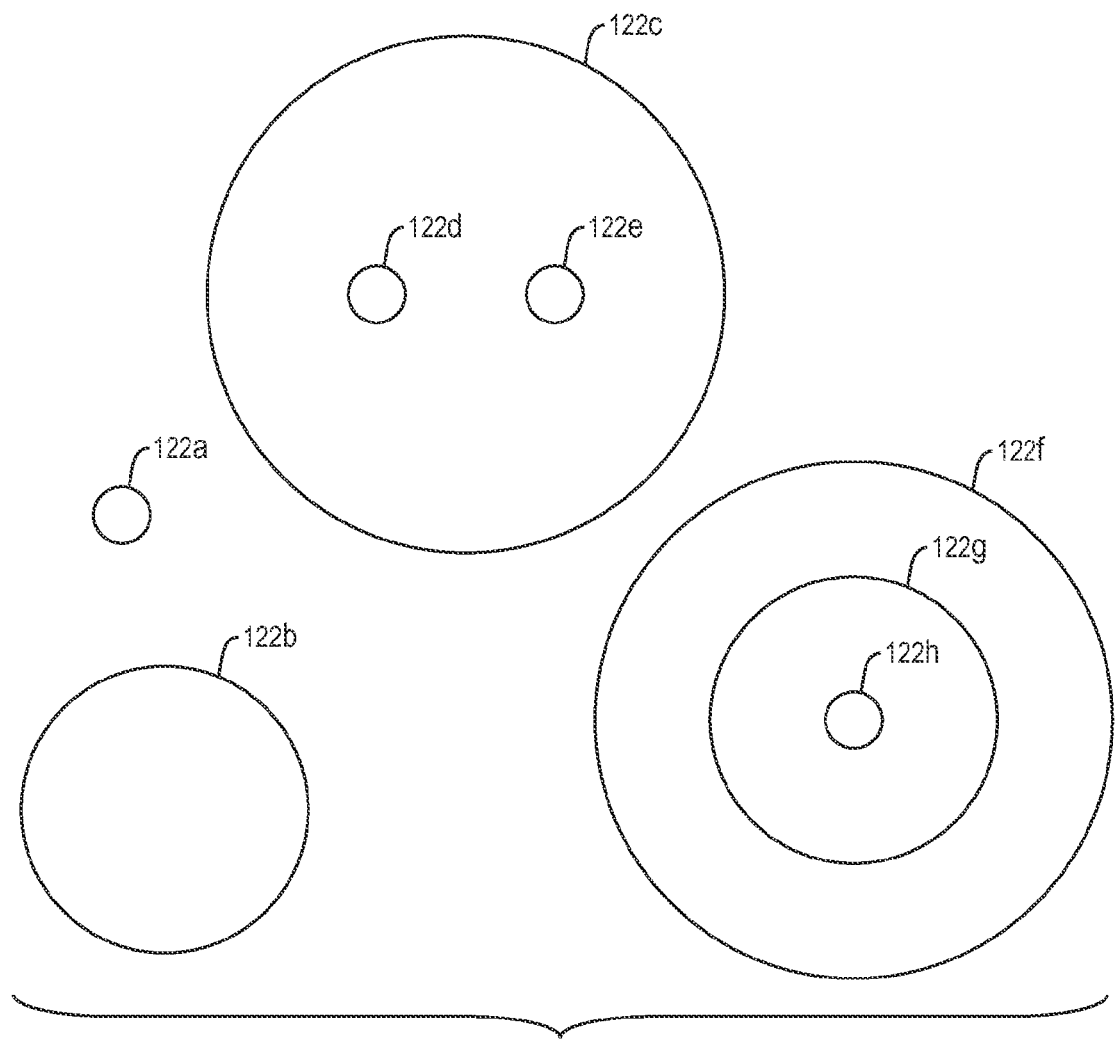
FIG. 1C is a diagram which illustrates resources of a first person according to one embodiment of the present invention.

As FIG. 1C illustrates, a resource may contain zero or more other resources, to any level of nesting. For example, in FIG. 1C, resource 122c contains resources 122d and 122e, as in the case of a web site that contains multiple web pages. As another example, resource 122f contains resource 122g, which contains resource 122h, as in the case of a database, which contains a table, which contains a record. As these examples illustrate, a particular person may have different resources of different types.

FIG. 1C merely provides a visual representation of the resources 122a-h for ease of illustration and explanation. The circles that are used to represent the affinity planes 122a-h in FIG. 1C, therefore, are not the resources themselves but rather merely one way in which the resources 122a-h may be displayed graphically. More generally, resources may be displayed and otherwise manifested in any of a variety of ways. Furthermore, resources may be represented and stored using any of a variety of data structures.

Referring again to FIG. 2, the system 200 further includes resource data 242 representing resources of users of the system 200. For purposes of example, the resource data 242 includes resource 244a for person $P_0$, resource data 244b for person $P_1$, and resource data 244c for person $P_2$.

In the particular example of FIG. 2, person $P_0$'s resource data 244a includes resource data 246a-h, which represent person $P_0$'s resources (e.g., resources 122a-h in FIG. 1C); person $P_1$'s resource data 244b includes resource data 248a-b, which represent person $P_1$'s resources; and person $P_2$'s resource data 244c includes resource data 250a, which represents person $P_2$'s resources. The particular number of resources shown in FIG. 2 is merely an example and does not constitute a limitation of the present invention.

The resource data 242 may represent the corresponding resources in any of a variety of ways, such as by including any one or more of the following: copies of the corresponding resources, references to the corresponding resources (e.g., URLs, pointers, or array indices), and summaries of the corresponding resources. The resources of different people may intersect. For example, resource data 246a of person $P_0$ may represent the same resource (e.g., document) as resource data 248a of person $P_1$.

As FIG. 2 illustrates, the term "a person's resources" may refer to any resources that are associated with that person by the use of suitable data. Any reference herein to a particular person "having" or "owning" resources or to the resources "of" a particular person should be understood to refer to the particular person's resources. For example, reference herein to "person $P_0$'s resources" or to the fact that "person $P_0$ has eight resources" or to the "resources of person $P_0$" should be understood to refer to the person $P_0$'s resources as defined by the resource data 244a in FIG. 2. As further illustrated by FIG. 2, different people may have different resources, and different people may have different numbers of resources. Although in some cases a person may be said to have a resource as a result of owning, having control over, or having created that resource, none of these are requirements of the present invention. Therefore, any references to the "owner" of a resource do not require legal ownership of the resource by the owner.

In general, any particular resource may be associated with zero, one, or more of another person's affinity planes. For example, referring to FIG. 3C, an example is shown of affinity plane-resource association data 352 according to one embodiment of the present invention. In general, the data 352 specifies, for each of a plurality of people (e.g., people $P_0$, $P_1$, and $P_2$), the resources that are associated with their affinity planes.

More specifically, affinity plane-resource association data 352 includes data 354a, 354b, and 354c, corresponding to people $P_0$, $P_1$, and $P_2$, respectively. For example, affinity plane-resource association data 354a specifies which resources are associated with person $P_0$'s affinity planes, affinity plane-resource association data 354b specifies which resources are associated with person $P_1$'s affinity planes, and affinity plane-resource association data 354c specifies which resources are associated with person P2's affinity planes. More specifically, person $P_0$'s affinity plane-resource association data 354a includes data 356a, which specifies which resources are associated with affinity plane 102a; data 356b, which specifies which resources are associated with affinity plane 102b; and data 356c, which specifies which resources are associated with affinity plane 102c. Person $P_1$'s affinity plane-resource association data 354b includes data 358a, which specifies which resources are associated with a first one of person $P_1$'s affinity planes; and data 358b, which specifies which resources are associated with a second one of person $P_1$'s affinity planes. Finally, person $P_2$'s affinity plane-resource association data 354c includes data 360a, which specifies which resources are associated with a first one of person $P_2$'s affinity planes.

As mentioned above, resources may be associated with a person's sectors. This is one way in which embodiments of the present invention may be used to control access to a person's resources. For example, if a second person $P_1$ who associated with person $P_0$'s sector 112c but not with person $P_0$'s sectors 112a-b requests access to a resource that is associated with person $P_0$'s sectors 112a-b but not with sector 112c, this may be taken into account when deciding whether to grant person $P_1$ with access to the resource. Ways in which the association of people with other people's sectors may be used to grant or deny resource access requests will be described in more detail below.

In general, any particular resource may be associated with zero, one, or more of a person's sectors. For example, referring to FIG. 3D, an example is shown of sector-resource association data 362 according to one embodiment of the present invention. In general, the data 362 specifies, for each of a plurality of people (e.g., people $P_0$, $P_1$, and $P_2$), the other people who are associated with their sectors.

More specifically, sector-resource association data 362 includes data 364a, 364b, and 364c, corresponding to people $P_0$, $P_1$, and $P_2$, respectively. For example, sector-resource association data 364a specifies which resources are associated with person $P_0$'s sectors, sector-resource association data 364b specifies which resources are associated with person $P_1$'s sectors, and sector-resource association data 364c specifies which resources are associated with person $P_2$'s sectors. More specifically, person $P_0$'s sector-resource association data 364a includes data 366a, which specifies which resources are associated with sector 112a; data 366b, which specifies which resources are associated with sector 112b; and data 366c, which specifies which resources are associated with sector 112c. Person $P_1$'s sector-resource association data 364b includes data 368a, which specifies which resources are associated with a first one of person $P_1$'s sectors. Finally, person $P_2$'s sector-resource association data 364c includes data 370a, which specifies which resources are associated with a first one of person $P_2$'s sectors; and data 370b, which specifies which resources are associated with a second one of person $P_2$'s sectors.

Figure 3C:
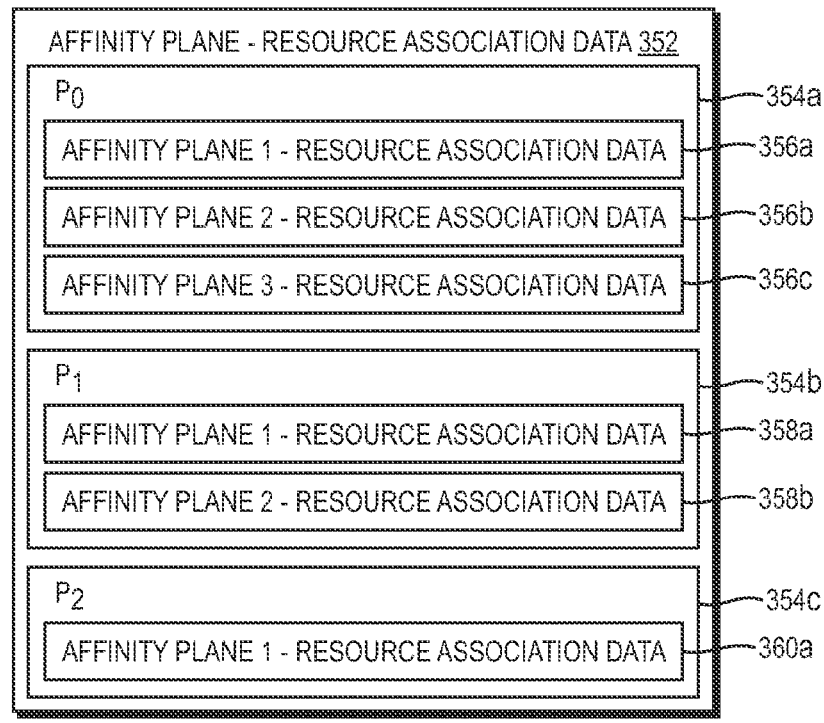
Figure 3D:
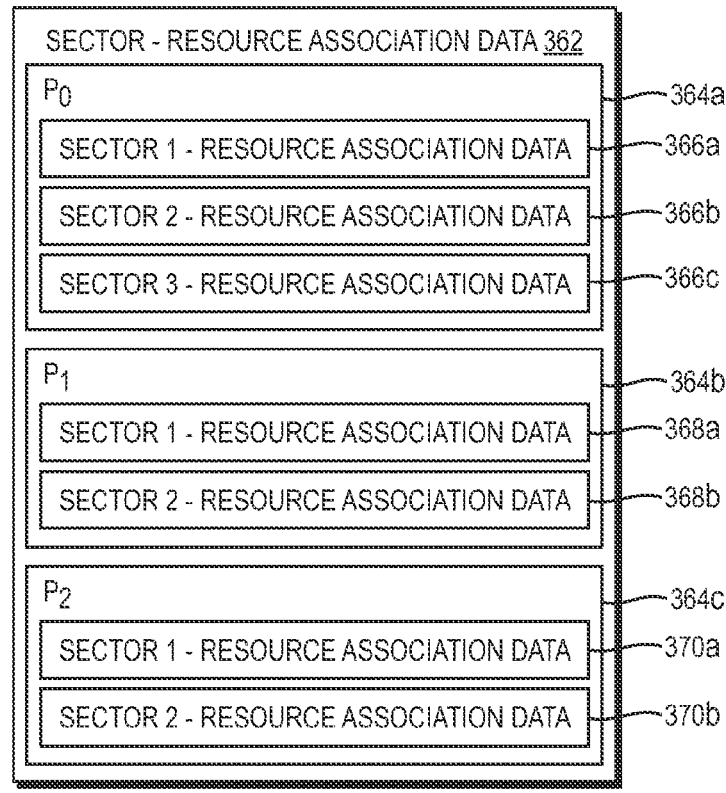

Although the sector association data 352 of FIG. 3C and the sector association data 362 of FIG. 3D are shown as distinct data in FIGS. 3C and 3D, this is merely an example and does not constitute a limitation of the present invention. The data 352 and 312 may be combined together and/or divided in any of a variety of ways.

Furthermore, the various data of FIGS. 3A-3D may be represented in other ways that will be apparent to those having ordinary skill in the art. For example, the data in FIGS. 3A-3D are illustrated as being person-centric, i.e., as storing data in relation to individual people. As another example, the data in FIGS. 3A and 3C are illustrated as being affinity plane-centric, i.e., as storing data in relation to affinity planes. As another example, the data in FIGS. 3B and 3D are illustrated as being sector-centric, i.e., as storing data in relation to sectors. All of these are merely examples and do not constitute limitations of the present invention. Alternatively or additionally, for example, data shown in FIGS. 3A-3D may be stored in a resource-centric way, e.g., by representing, for each resource, the people, affinity planes, and/or sectors associated with that resource.

The affinity plane-person association data 302 of FIG. 3A and the sector-person association data 312 of FIG. 3B may specify the people associated with affinity planes and sectors, respectively, in any of a variety of ways, such as by using an individual identifier for each person (e.g., real name or email address), or by defining criteria that are satisfied by the associated people. Similarly, the affinity plane-resource association data 352 of FIG. 3C and the sector-resource association data 362 of FIG. 3D may specify the resources associated with affinity planes and sectors, respectively, in any of a variety of ways, such as by using an individual identifier for each resource (e.g., URL or filename), or by defining criteria that are satisfied by the associated resources.

As described above, people may be associated with affinity planes and/or sectors. People who themselves do not have any affinity planes and/or sectors, however, may be associated with the affinity planes and/or sectors of other people. For example, if the techniques disclosed herein are implemented in a computer system in which people $P_0$, $P_1$, and $P_2$ are users of the system and have their own affinity planes and sectors, other people who are not users of the system may nonetheless be associated with affinity planes and/or sectors of users $P_0$, $P_1$, and $P_2$.

In the particular examples described above, affinity planes are illustrated as circles and sectors are illustrated as wedges or partial wedges within those circles. Consider, for example, the wedge that represents sector 112a in FIG. 1B. The portion this wedge that falls within affinity plane 102c represents all of person $P_0$'s resources that are associated with affinity plane 102c and sector 112a. Embodiments of the present invention may, however, be used to associate resources with less than all of the overlap between a particular affinity plane and sector. In general, a resource may be associated with any portion of an affinity plane and any portion of a sector.

As mentioned above, embodiments of the present invention may be used to control access to resources associated with people. In general, embodiments of the present invention may, for example, respond to a request by one person (e.g., person $P_1$) to access one or more resources of another person (e.g., person $P_0$). The access request may specify the resource(s) for which access is requested at any level of generality. For example, the access request may request access to a single specified resource (e.g., using a URL or filename and path) or to multiple resources. In the latter case, the access request may specify the requested resources in any of a variety of ways, such as by specifying one or more affinity planes, sectors, categories (e.g., music, business, sports), keywords, addresses (e.g., URLs or file paths), regular expressions, or search queries expressed in a natural language or formal language (e.g., SQL).

In the most general case, the access request may request access to all of a particular person's resources, in response to which an embodiment of the present invention may provide the requestor with access only to those resources which the requestor is entitled to access, in accordance with the techniques described below.

Figure 4:
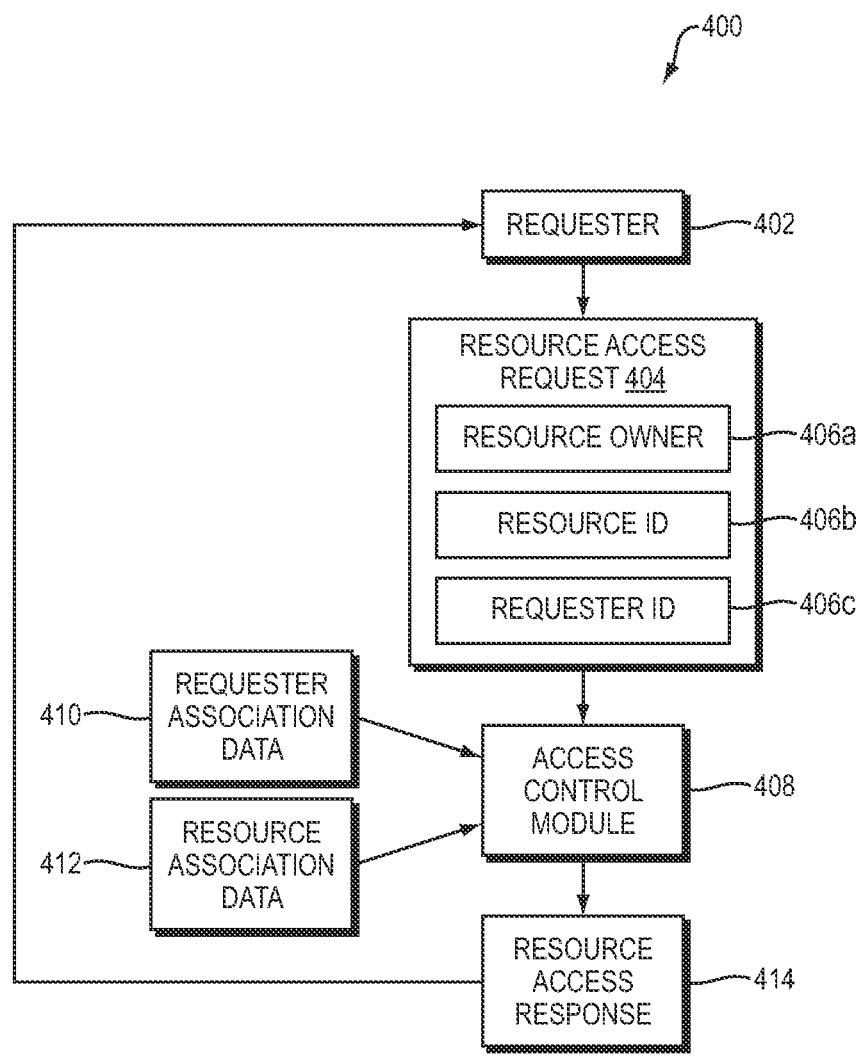
FIG. 4 is a dataflow diagram of a system for processing resource access requests according to one embodiment of the present invention.
Figure 5:
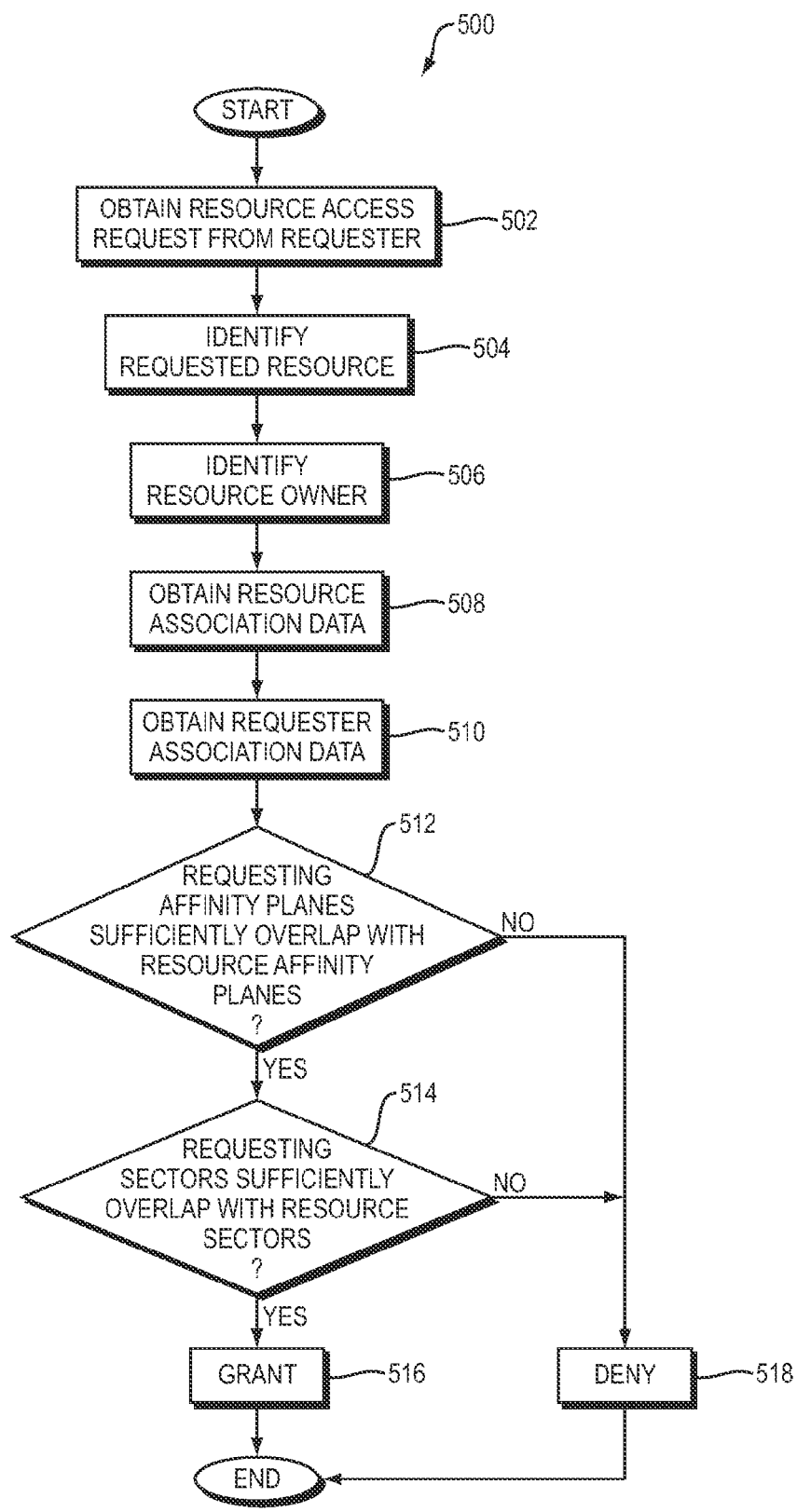
FIG. 5 is a flowchart of a method performed by the system of FIG. 4 according to one embodiment of the present invention.

For example, referring to FIG. 4, a dataflow diagram is shown of a system 400 for processing resource access requests according to one embodiment of the present invention. Referring to FIG. 5, a flowchart is shown of a method 500 performed by the system 400 of FIG. 4 according to one embodiment of the present invention.

The system 400 includes an access control module 408. A requestor 402 provides a resource access request 404 to the access control module 408, which receives the request 404 (FIG. 5, operation 502). In general, the request 404 contains data that specifies a request to access one or more resources of a person. For purposes of example in the following discussion, assume that the request 404 requests access to a single resource 122b of person $P_0$. The requestor 402 may, for example, be a person other than person $P_0$ or a machine or computer program. The techniques of FIGS. 4 and 5 may, however, be repeated as necessary to process multiple requests to access a single resource of person $P_0$, or to process a single request to access multiple resources of person $P_0$.

The resource access request 404 may include or otherwise specify (e.g., define or point to) a variety of data that may be used in the process of determining whether to grant the resource access request 404. For example, the resource access request may include one or more of the following: resource owner data 406a, which identifies an owner of the requested resource; a resource identifier (ID) 406b, which identifies the requested resource; and a requester identifier (ID) 406c, which identifies the requestor 402. The elements 406a-c shown in FIG. 4 are merely examples and do not constitute limitations of the present invention.

The access control module 408 identifies the requested resource, such as by using the resource ID 406b (FIG. 5, operation 504). The access control module 408 identifies the owner of the requested resource, such as by using the resource ID 406b and/or the resource owner ID 406a (FIG. 5, operation 506). The access control module 408 obtains resource association data 412, which specifies the affinity planes and/or sectors of the resource owner (if any) with which the requested resource is associated (FIG. 5, operation 508). The access control module 408 may, for example, obtain the resource association data 412 by analyzing the affinity plane-resource association data 352 (FIG. 3C) and the sector-resource association data 372 (FIG. 3D).

The access control module 408 obtains requester association data 410, which specifies the affinity planes and/or sectors of the resource owner (if any) with which the requester is associated (FIG. 5, operation 510). The access control module 408 may, for example, obtain the requester association data 410 by analyzing the affinity plane-person association data 302 (FIG. 3A) and the sector-person association data 322 (FIG. 3B).

The access control module 408 determines whether to grant the resource access request 404 based on the resource association data 412 and the requester association data 410. In particular, the access control module 408 may grant the request 404 only if the requester 402 is associated with one or more affinity planes of the resource owner that sufficiently overlap with one or more affinity planes associated with the requested resource (FIG. 5, operations 512, 514, and 516). Otherwise, the access control module 408 may deny the request 404 (FIG. 5, operations 512, 514, and 518). In either case, the access control module 408 may generate a resource access response 414 representing the outcome of the decision to grant or deny the request 404. The access control module 408 may provide the response 414 to the requester 402 in any of a variety of ways. For example, the response 414 may include a message informing the requestor 402 of the decision. As another example, if the response 414 represents a decision to grant the request 404, the response 414 may include a copy of or reference to the requested resource.

The overlap determinations in operations 512 and 514 of FIG. 5 may be performed in any of a variety of ways. For example, the overlap determination in operation 512 may be satisfied only by complete overlap of all requester-associated affinity planes with all resource-associated affinity planes. Similarly, the overlap determination in operation 514 may be satisfied only by complete overlap of all requester-associated sectors with all resource-associated sectors. Alternatively, for example, overlap may be considered to be sufficient if the overlap exceeds some predetermined percentage or satisfies some other predetermined criteria.

As mentioned above, a resource access request may request access to a plurality of person $P_0$'s resources. In response to such a request, the system 400 of FIG. 4 and method 500 of FIG. 5 may loop over all of the requested resources, and grant or deny access to each such resource in accordance with the method 500 of FIG. 5. For example, embodiments of the present invention may provide person $P_0$ with a personalized graphical user interface (GUI) which may display information about resources accessible to the person to whom the GUI is displayed at any particular point in time. The personalized GUI may, for example, take the form of a web page accessible via a particular URL or associated with a particular user account in an online system. When another user $P_1$ requests that person $P_0$'s GUI be displayed (such as by navigating to person $P_0$'s personalized home page), the request to retrieve the personalized GUI may be treated by the system 400 and method 500 as a request by user $P_1$ to access and view all of user $P_0$'s resources, or at least to access and view some of user $P_0$'s resources as dictated by the layout of the home page. In response, the system 400 and method 500 may display, via the personalized GUI, representations of only those resources of person $P_0$ which person $P_1$ is entitled to access in accordance with the system 400 and method 500.

Figure 11:
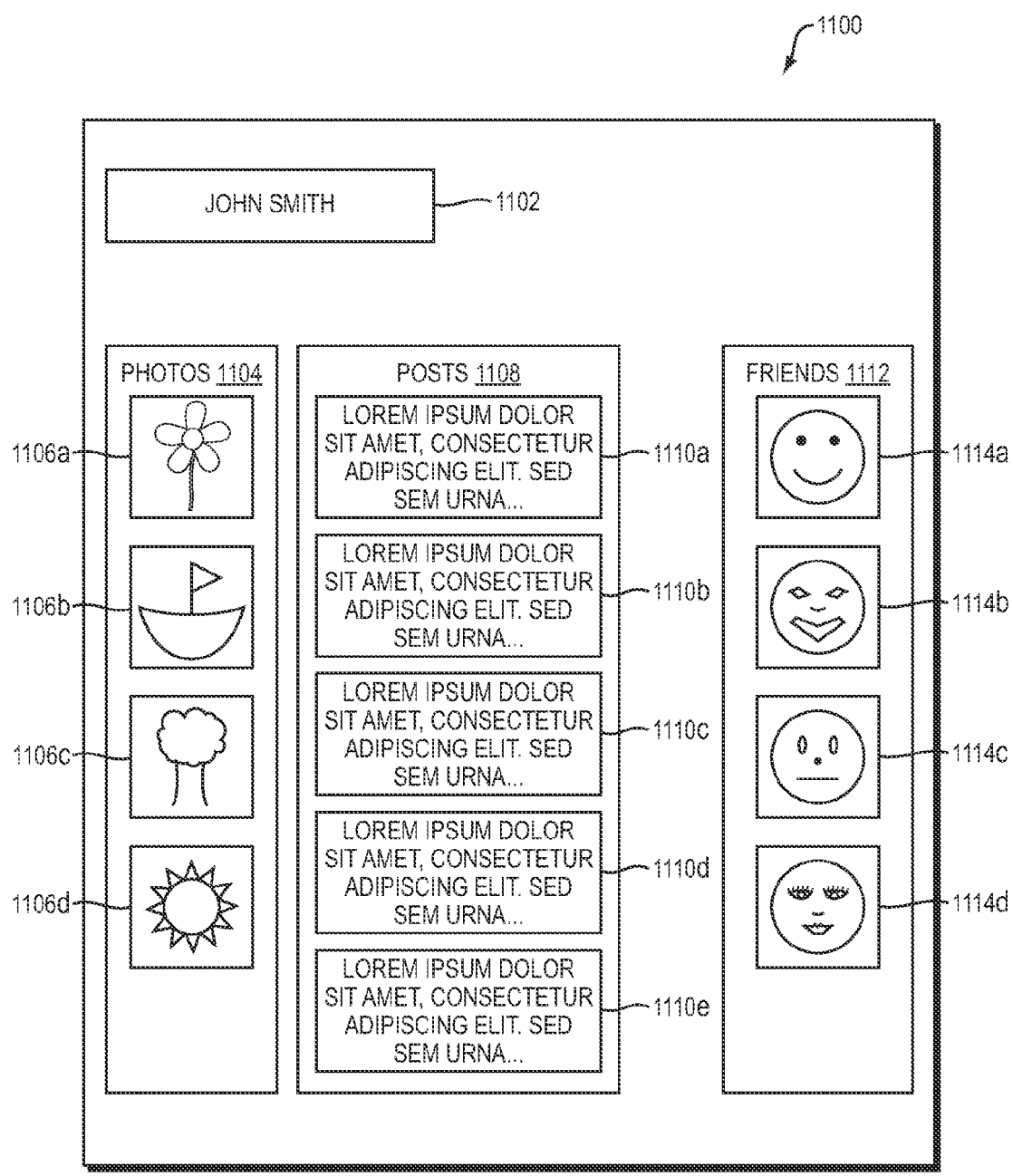
FIG. 11 is an illustration of a graphical user interface for displaying resources and sectors associated with a first person and accessible to a second person according to one embodiment of the present invention.

An example of such a personalized GUI 1100 is shown in FIG. 11. The GUI 1100 includes text 1102 representing the name of the person $P_0$ associated with the home page, a photos areas 1104, a posts area 1108, and a friends area 1112. The particular set of areas shown in FIG. 11 and the layout of such areas is merely an example and does not constitute a limitation of the present invention. In general, photos area 1104 displays photos of person $P_0$ which person $P_1$ is entitled to access, posts area 1108 displays posts of person $P_0$ which person $P_1$ is entitled to access, and friends area 1112 displays images of friends of person $P_0$ which person $P_1$ is entitled to access. In the particular example of FIG. 1100, photos area 1104 includes four photos 1106a-d (which may contain fewer than all of person $P_0$'s photos), posts area 1108 includes five posts 1110a-e (which may contain fewer than all of person $P_0$'s posts), and friends area 1112 includes four friend images 1114a-d (which may contain images of fewer than all of person $P_0$'s friends).

The GUI 1100 is "personalized" in the sense that it has been filtered by the system 400 and method 500 to display to person $P_1$ only those resources of person $P_0$ that person $P_1$ is entitled to access. If a different person $P_2$ were to navigate to person $P_0$'s home page, the system 400 and method 500 would identify person $P_2$ and, based on person $P_2$'s identity, apply the method 400 and system 500 to produce a personalized GUI of person $P_0$ that has the same form as the GUI 1100 of FIG. 11 but that may differ in content from the GUI 1100 of FIG. 11. In particular, the personalized GUI displayed to person $P_2$ would display only those resources of person $P_0$ (e.g., photos, posts, and friends) that person $P_2$ is entitled to access, which may differ from the resources of person $P_0$, shown in FIG. 11, that person $P_1$ is entitled to access. The system 400 and method 500, in other words, may customize the content displayed in person $P_0$'s GUI to any particular person by tailoring that content based on the access rights of that person in relation to person $P_0$.

As described above, multiple people may each have their own affinity planes, sectors, and resources. Although the description above focuses primarily on person $P_0$ and the associations of other people with person $P_0$'s affinity planes and sectors, this is merely an example and does not constitute a limitation of the present invention. The techniques disclosed herein may be applied to the affinity planes, sectors, and resources of multiple people (e.g., people $P_1$ and $P_2$ in the examples herein) and to the associations of other people with those affinity planes and sectors. As a result, when the system 400 of FIG. 4 and the system 500 of FIG. 5 are applied to requests to access the resources of other people, the particular relationships of the requestor to the affinity planes and sectors of the resource owner will be taken into account by the system 400 and method 500 to determine whether to grant those requests.

One consequence of this is that a request by one person (e.g., person $P_1$) to access a particular resource of another person (e.g., person $P_0$) may be granted by the system 400 and method 500 based on the particular associations of person $P_1$ and the requested resource with the affinity planes and sectors of the resource owner $P_0$, while a request by the same person $P_1$ to access the same or similar resource of another person (e.g., person $P_2$) may be denied by the system 400 and method 500 based on the particular associations of person $P_1$ and the requested resource with the affinity planes and sectors of the other resource owner $P_2$. As this example makes clear, embodiments of the present invention determine whether to grant resource access requests based on the particular web of associations between the requestor and the resource owner's affinity planes, sectors, and resources.

Embodiments of the present invention enable resource owners to limit the times during which others may access those resources. Such temporal restrictions on resource access may be implemented in a variety of ways. For example, any affinity plane may be associated with an accessibility time period, which may, for example, be represented by data within the affinity plane's definition in the affinity plane data 202 (FIG. 2). Similarly, any sector may be associated with an accessibility time period, which may, for example, be represented by data within the sector's definition in the sector data 222 (FIG. 2).

An accessibility time period may define times during which the corresponding affinity plane or sector is accessible to others in any of a variety of ways, such as by specifying a start time and an end time, a start time and a duration, or a definition of a recurring time period (e.g., daily from 9 am-5 pm, on weekdays after 6 pm). As another example, the start time of an accessibility time period may be derived from the start time of an event (such as the beginning of a project). Similarly, the end time of an accessibility time period may be derived from the end time of an event. Different affinity planes may share a common accessibility time period or have distinct accessibility time periods. Similarly, different sectors may share a common accessibility time period or have distinct accessibility time periods. Any technique described herein as being applied to an accessibility time period may be applied equally to an inaccessibility time period, i.e., a time period in which people are denied access to resources within an affinity plane and/or sector, even if those people are associated with the affinity plane and/or sector.

The method 400 and system 500 of FIGS. 4 and 5 may use the accessibility time periods of affinity planes and sectors to limit the times during which the requestor 402 is granted access to the requested resource. For example, the access control module 408 may, as part of the method 500, identify a current time (such as a time specified by a clock or a time specified by the request 404). The access control module 408 may then treat the current time as an additional condition which must be satisfied by any accessibility time periods associated with affinity planes and sectors analyzed in operations 512 and 514 in the method 500 of FIG. 5. For example, the access control module 408 may consider the condition of operation 512 to be satisfied only if: (1) the affinity planes of the resource owner that are associated with the requestor 402 either have no accessibility time period or have an accessibility time period that includes the current time; and (2) the requestor-associated affinity planes sufficiently overlap with the resource-associated affinity planes. Similarly, the access control module 408 may consider the condition of operation 514 to be satisfied only if: (1) the sectors of the resource owner that are associated with the requestor 402 either have no accessibility time period or have an accessibility time period that includes the current time; and (2) the request-associated sectors sufficiently overlap with the resource-associated sectors.

The resource access control system 400 and method of FIGS. 4 and 5, which controls access to resources based on affinity planes and sectors, may be supplemented by the use of rules. For example, the owner of a resource may define one or more rules that must be satisfied to grant access to the resource. In this case, the access control module 408 may, as part of the method 500, also identify the rule(s), if any, associated with the requested resource, apply the identified rule, and deny access to the requested resource if the identified rule is not satisfied. The access control module 408 may, in other words, treat the identified rule as an additional condition that must be satisfied to grant access to the requested resource.

Different rules may be associated with different resources. The conditions of a rule may, for example, apply to data associated with the requester 402, such as the requestor's name, ID (e.g., email address), or category (e.g., friend, family, co-worker). Rules may include temporal conditions, such as any one or more of the following: a date and/or time of the request, a duration of the request, and an age of the requestor. Rules may include location-based conditions, such as any one or more of the following: a geographic region of the region (e.g., as defined by a range of coordinates), a current proximity of the requestor to the person whose resources are the target of the request, and a type of location of the request (e.g., park, home, school, stadium).

Figure 12:
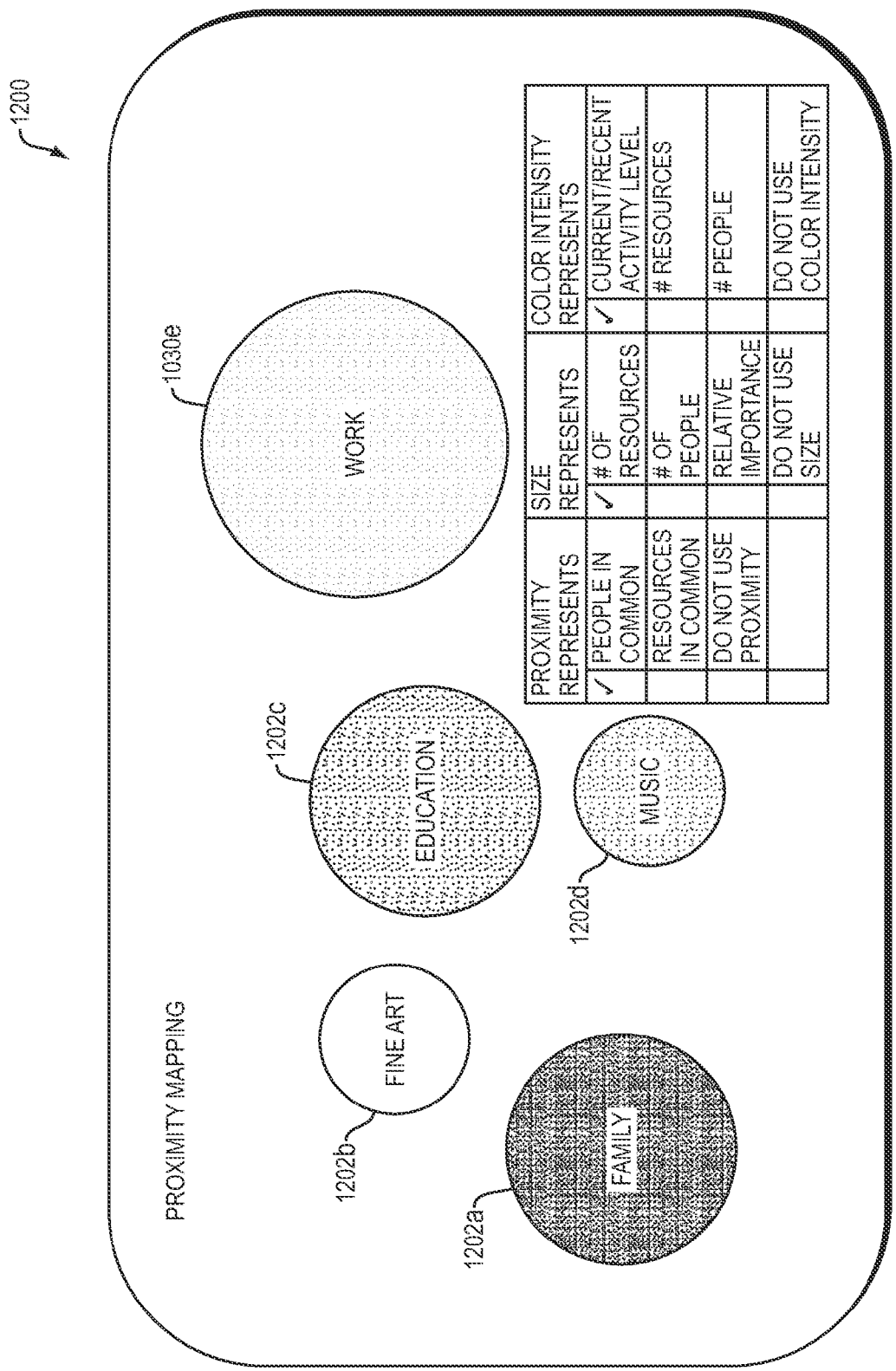
FIG. 12 is an illustration of a graphical user interface displaying affinity planes using circles, and in which the sizes and distances between circles represent properties of the affinity planes and their relationships with each other according to one embodiment of the present invention.

Relationships among people, resources, affinity planes, and sectors may be displayed visually in any of a variety of ways. For example, embodiments of the present invention may be used to display a user's affinity planes in a proximity map, as shown by the example display 1200 of FIG. 12. Assume for purposes of example that the display 1200 represents the affinity planes of a particular person $P_0$ as circles 1202*a-e*. The proximity of (i.e., distance between) any two of the circles 1202*a-e* to each other may represent the number of people and/or resources shared by the two circles. For example, circle 1202*a* is closer to circle 1202*b* than to circle 1202*e*, which indicates that the family affinity plane 1202*a* contains more people and/or resources in common with the fine art affinity plane 1202*b* than with the work affinity plane 1202*e*.

Other visual features of the circles 1202*a-e* may be varied to represent properties of the affinity planes 1202*a-e* and their relationships with each other. For example, size and/or color of the circles 1202*a-e* may be used to represent comparative metrics. For example, the size and/or color of the circles 1202*a-e* may vary based on the number of resources contained, the current activity level, or the relative importance (e.g., weight and/or rank) of the corresponding affinity planes.

Each person within the network of a particular person (e.g., person $P_0$) may be assigned an "affinity coefficient" in relation to person $P_0$ based on factors such as the person's number of occurrences within person $P_0$'s affinity planes and the relative importance of the topics in which the person occurs In one particular embodiment, such an affinity coefficient may be calculated using the following equation:

$$c_p = \frac{\sum_{a=1}^{n} occurrences_{p,i} * weight_a}{\sum_{p=1}^{m} \sum_{i=1}^{n} occurrences_{p,i} * weight_i}$$

Once such an affinity coefficient has been calculated for multiple people, e.g., people $P_1$ and $P_2$, the affinity coefficients for those people may be used to display the relative strengths of the relationships between person $P_0$ and each of people $P_1$ and $P_2$. Such a display may, for example, take the form of a pie chart in which each person $P_1$ and $P_2$ is represented by a pie slice that is proportional in size to the person's affinity coefficient. As another example, such a display may take the form of a bar chart in which each person $P_1$ and $P_2$ is represented by a bar that is proportional in size to the person's affinity coefficient.

Embodiments of the present invention may be used to display various other features of people, resources, affinity planes, and sectors. For example, the people and/or resources that are associated with affinity planes and/or sectors may change over time. Embodiments of the present invention may record (i.e., take "snapshots" of) the state of a particular person's affinity planes and/or sectors at multiple points in time, and then display two or more of those snapshots, such as by displaying those snapshots simultaneously side-by-side, simultaneously in a three-dimensional cylinder, or sequentially in an animation that demonstrates the change in association of people/resources with planes/sectors over time. For example, referring to FIG. 13, an illustration is shown of a display 1300 of four snapshots 1302*a-d* of a user's affinity planes and sectors over time. In the particular example of FIG. 13, the display 1300 shows the snapshots 1302*a-d* as planes drawn in perspective, in chronological order with the oldest snapshot 1302*a* at the bottom and the most recent snapshot 1302*d* at the top.

In the particular example of FIG. 13, the snapshots 1302*a-d* are snapshots of the affinity planes and sectors of person $P_0$, with the oldest snapshot 1302*a* being a snapshot of person $P_0$'s affinity planes and sectors at the time shown in FIG. 1B. The snapshot 1302*a*, therefore, is identical to the affinity planes and sectors shown in FIG. 1B, except that the snapshot 1302*a* in FIG. 13 is shown in perspective.

The next snapshot 1302*b* is identical to the snapshot 1302*a*, except that the sector 112*c* has been removed and the sector 112*b* extends into the center of affinity plane 112*a* (as indicated by the labeling of the modified sector as 112*b'*). These changes represent changes that were made (e.g., manually by person $P_0$) after the time at which snapshot 1302*a* was taken and before snapshot 1302*b* was taken.

The next snapshot 1302*b* is identical to the snapshot 1302*c*, except that a box 1304, extending across parts of affinity planes 102*b* and 102*c*, has been added. The box 1304, which may be associated with one or more people other than person $P_0$, indicates that the people associated with the box 1304 have the right to access some, but not all, of the resources within affinity planes 102*b* and 102*c*. The differences between snapshot 1302*b* and 1302*c* represent changes that were made (e.g., manually by person $P_0$) after the time at which snapshot 1302*b* was taken and before snapshot 1302*c* was taken.

The next snapshot 1302*b* is identical to the snapshot 1302*c*, except that an additional affinity plane 102*d* has been added. The new affinity plane 102*d* may be of any of the types described herein, and may be used to control access to person $P_0$'s resources in any of the ways disclosed herein. The differences between snapshot 1302*c* and 1302*d* represent changes that were made (e.g., manually by person $P_0$) after the time at which snapshot 1302*c* was taken and before snapshot 1302*d* was taken.

Although in FIG. 13 only the affinity planes change over time (i.e., from snapshot to snapshot), this is merely an example and does not constitute a limitation of the present invention. More generally, graphical user interfaces such as the one shown in FIG. 13 may show changes in any one or more of the following, without limitation: affinity planes, sectors, boxes, and assignment of people and/or resources to affinity planes, sectors, and boxes.

The particular number, content, and graphical representation of the snapshots 1302*a-d* shown in FIG. 13 are merely examples and do not constitute limitations of the present invention. Those having ordinary skill in the art will appreciate that changes to affinity planes and sectors over time may be recorded and displayed in any manner.

Among the advantages of the invention are one or more of the following. For example, in general, embodiments of the present invention enable users to exercise flexible, fine-grained control over access to their resources, in a way that is at least partially automated. Existing systems tend to provide users either with no control over access to their resources, or only simple access to their resources on a user-by-user or role-by-role basis. Often, such control is merely binary in nature, in which other users who are "friends" are granted unlimited access and in which non-"friends" are granted no access. In contrast, embodiments of the present invention provide users with a high degree of flexibility in defining and implementing resource access control, based on a combination of the user's relationship to the requestor and the sector (e.g., domain) of the requested resource. As a result, embodiments of the present invention enable users to overcome the limitations of simple role-based resource access control.

Another advantage of embodiments of the present invention is that they enable people and resources to be assigned to affinity planes and sectors automatically or semi-automatically. For example, documents may be assigned automatically to sectors based on the degree of similarity between the contents of the documents and the keywords that define the sectors. Such a feature may be used to relieve users of the burden of manually assigning each resource to an affinity plane and/or sector, and to reduce the likelihood of false positives (i.e., assigning a resource to an affinity plane or sector to which it should not have been assigned) and false negatives (i.e., failing to assign a resource to an affinity plane or sector to which it should have been assigned).

A related benefit of embodiments of the present invention is that they enable users to manually assign people and resources to affinity planes and sectors, thereby providing users with whatever degree of control they desire over such assignment. For example, in some cases users may desire to assign resources to affinity planes and sectors manually on a resource-by-resource basis (as in the case of particularly sensitive resources). As another example, users may prefer for the system to automatically assign resources to affinity planes and sectors as a first pass, and then to review the system's automatic assignments and manually correct any incorrect assignments. Embodiments of the present invention enable users to combine automatic and manual assignment in any combination they please, thereby providing users with maximum control over access to their resources without imposing an undue burden on them to perform assignments manually in all cases.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

Various references are made herein to "resources," such as resources owned, created, or otherwise associated with a particular person. Examples of such resources include, but are not limited to, documents (such as word processing documents, spreadsheet documents, presentation documents, and multimedia documents), music and other audio files, videos, databases, messages (such as email messages, text messages, voicemail messages, and social networking messages), web sites and web pages, blogs and blog postings, user credentials (such as usernames and passwords for web sites and applications), user profiles (such as user profiles on social networking systems), demographic data (such as age, sex, religion, race, nationality, and income), medical records, behavioral data (such as records of inputs provided to applications and web sites), and tags that act as links to or proxies for other descriptors (such as XML tags, URLs, and VRML tags). Although certain examples of resources provided herein are static resources, such as static images, this is not a limitation of the present invention. Resources may be dynamic, such as documents that change over time and resources (such as calendar appointments) that occur during certain times and not during other times. The term "resource" includes any portion(s) of a resource (such as the contents of a single page on a web site or a single record in a database) and any combination of resources (such as a combination of the content of a web page and its URL).

Various elements of embodiments of the present invention may be predefined (e.g., by a system administrator) and then applied to the resources, affinity planes, and sectors of one or more users. Additionally or alternatively, such elements may be defined by individual users and then applied to the resources, affinity planes, and sectors of those users.

For example, one or more affinity planes may be predefined and then made available for use by one or more users of the system. Similarly, one or more sectors may be predefined and then made available for use by one or more users of the system. As another example, a particular user $P_0$ may define one or more affinity planes, which may then be made available for use solely by user $P_0$, or be made available for use by both user $P_0$ and other users. Similarly, a particular user $P_0$ may define one or more sectors, which may then be made available for use solely by user $P_0$, or be made available for use by both user $P_0$ and other users.

As yet another example, one or more assignment rules for automatically assigning people and/or resources to affinity planes and/or sectors may be predefined and then made available for use by one or more users of the system. As yet another example, a particular user $P_0$ may define one or more assignment rules, which may then be made available for use solely by user $P_0$, or be made available for use by both user $P_0$ and other users.

Although entities such as $P_0$, $P_1$, and $P_2$ are referred to herein as "people," this is merely an example and does not constitute a limitation of the present invention. More generally, an entity such as $P_0$ may, for example, be an organization (such as a for-profit or non-profit corporation), product, or brand. Therefore, any reference herein to a "person" should be understood to refer more generally to any entity, such as an entity of any of the kinds just listed.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method for use with a system, wherein the method is performed by at least one computer processor executing computer program instructions stored on at least one non-transitory computer-readable medium, the system comprising:
 data representing a plurality of associations between a plurality of affinity planes, including an affinity plane $A_0$ and an affinity plane $A_1$, and a first person $P_0$;
 data representing a plurality of associations between a plurality of sectors, including a sector $S_0$ and a sector $S_1$, and the first person $P_0$;
 data representing an association Affinity_$P_0$ ($A_0$,$P_1$) between an affinity plane $A_0$ and second person $P_1$, wherein the affinity plane $A_0$ represents a first closeness of relationship to person $P_0$;
 data representing an association Sector_$P_0$($S_0$,$P_1$) between a sector $S_0$ and second person $P_1$, wherein the sector $S_0$ represents a first topic of interest to the first person $P_0$;
 data representing an association Affinity_$P_0$ ($A_1$,$R_0$) between an affinity plane $A_1$ and a first resource $R_0$ stored in a social networking account of the first person $P_0$ on a non-transitory computer-readable medium, wherein the affinity plane $A_1$ represents a second closeness of relationship to person $P_0$, wherein the first closeness of relationship differs from the second closeness of relationship;
 data representing an association Sector_$P_0$ ($S_1$,$R_0$) between a sector $S_1$ and first resource $R_0$, wherein the sector $S_1$ represents a second topic of interest to the first person $P_0$, wherein the first topic differs from the second topic;
 wherein the method comprises:
 (1) receiving a request to grant person $P_1$ with access to resource $R_0$;
 (2) identifying, based on the request, the first person $P_0$;

(3) identifying the affinity plane $A_0$ based on the first person $P_0$, the second person $P_1$, and the data representing the association Affinity_$P_0(A_0,P_1)$;

(4) identifying the sector $S_0$ based on the first person $P_0$, the second person $P_1$, and the data representing the association Sector_$P_0(S_0,P_1)$;

(5) identifying the affinity plane $A_1$ based on the first person $P_0$, the resource $R_0$, and the data representing the association Affinity_$P_0(A_1,R_0)$;

(6) identifying the sector $S_1$ based on the first person $P_0$, the resource $R_0$, and the data representing the association Sector_$P_0(S_1,R_0)$;

(7) determining whether affinity plane $A_0$ includes affinity plane $A_1$;

(8) determining whether sector $S_0$ includes sector $S_1$; and (9) granting person $P_1$ with access to resource $R_0$ if: (a) affinity plane $A_0$ is determined to include affinity plane $A_1$; and (b) sector $S_0$ is determined to include sector $S_1$, comprising:

(9) (a) granting the request if affinity plane $A_0$ is determined to include affinity plane $A_1$ and sector $S_0$ is determined to include sector $S_1$; and (9) (b) denying the request if affinity plane $A_0$ is not determined to include affinity plane $A_1$ or sector $S_0$ is not determined to include sector $S_1$.

2. The method of claim 1, wherein the request comprises a request specifying resource $R_0$.

3. The method of claim 1, wherein the request comprises a request to access a plurality of resources including resource $R_0$.

4. The method of claim 3, wherein the request comprises a request to access an affinity plane containing resource $R_0$.

5. The method of claim 3, wherein the request comprises a request to access a sector containing resource $R_0$.

6. The method of claim 1, wherein the affinity plane $A_0$ contains the affinity plane $A_1$.

7. The method of claim 1, wherein the affinity plane $A_0$ contains some but not all of the affinity plane $A_1$.

8. The method of claim 1, wherein the affinity plane $A_0$ and the affinity plane $A_1$ are disjoint.

9. The method of claim 1, wherein the sector $S_0$ contains the sector $S_1$.

10. The method of claim 1, wherein the sector $S_0$ contains some but not all of the sector $S_1$.

11. The method of claim 1, wherein the sector $S_0$ and the sector $S_1$ are disjoint.

12. The method of claim 1:
wherein the data representing the association between the second person $P_1$ and the affinity plane $A_0$ comprises data representing an association between the second person $P_1$ and affinity planes $A_0$ and $A_2$, wherein affinity plane $A_2$ is within the plurality of affinity planes associated with first person $P_0$;
wherein (7) comprises determining whether affinity planes $A_0$ and/or $A_2$ include affinity plane $A_1$; and
wherein (9) comprises granting person $P_1$ with access to resource $R_0$ if: (a) affinity plane $A_0$ and/or $A_2$ is determined to include affinity plane $A_1$; and (b) sector $S_0$ is determined to include sector $S_1$.

13. The method of claim 1:
wherein the data representing the association between the second person $P_1$ and the sector $S_0$ comprises data representing an association between the second person $P_1$ and sectors $S_0$ and $S_2$, wherein sector $S_2$ is within the plurality of sectors associated with first person $P_0$;

wherein (8) comprises determining whether sectors $S_0$ and/or $S_2$ include sector $S_1$; and
wherein (9) comprises granting person $P_1$ with access to resource $R_0$ if: (a) affinity plane $A_0$ is determined to include affinity plane $A_1$; and (b) sector $S_0$ and/or $S_2$ is determined to include sector $S_1$.

14. The method of claim 1:
wherein the data representing the association between the first resource $R_0$ and the affinity plane $A_1$ comprises data representing an association between first resource $R_0$ and affinity planes $A_1$ and $A_2$, wherein affinity plane $A_2$ is within the plurality of affinity planes associated with first person $P_0$;
wherein (7) comprises determining whether affinity plane $A_0$ includes affinity planes $A_1$ and/or $A_2$; and
wherein (9) comprises granting person $P_1$ with access to resource $R_0$ if: (a) affinity plane $A_0$ is determined to include affinity planes $A_1$ and/or $A_2$; and (b) sector $S_0$ is determined to include sector $S_1$.

15. The method of claim 1:
wherein the data representing the association between the first resource $R_0$ and the sector $S_1$ comprises data representing an association between first resource $R_0$ associated with sectors $S_1$ and $S_2$, wherein sector $S_2$ is within the plurality of sectors associated with first person $P_0$;
wherein (8) comprises determining whether sector $S_0$ includes sectors $S_1$ and/or $S_2$; and
wherein (9) comprises granting person B with access to resource $R_0$ if: (a) affinity plane $A_0$ is determined to include affinity plane $A_1$; and (b) sector $S_0$ is determined to include sectors $S_1$ and/or $S_2$.

16. The method of claim 1, wherein the system further comprises:
data representing an association Affinity_$P_0(A_3,P_2)$ between an affinity plane $A_2$ and a third person $P_3$, wherein affinity plane $A_2$ is identical to affinity plane $A_0$.

17. The method of claim 1, wherein the system further comprises:
data representing an association Affinity_$P_0(A_2,R_1)$ between an affinity plane $A_2$ and a second resource $R_1$, wherein affinity plane $A_2$ is identical to affinity plane $A_1$.

18. The method of claim 1, wherein the system further comprising:
data representing an association Sector_$P_0(S_2,P_2)$ between a sector $S_2$ and a third person $P_2$, wherein sector $S_2$ is identical to sector $S_0$.

19. The method of claim 1, wherein the system further comprises:
data representing an association Sector_$P_0(S_2,R_1)$ between a sector $S_2$ and a second resource $R_1$, wherein sector $S_2$ is identical to sector $S_1$.

20. The method of claim 1, wherein the system further comprises:
data representing a plurality of associations between a plurality of affinity planes and the second person $P_1$;
data representing a plurality of associations between a plurality of sectors and the second person $P_1$;
data representing an association Affinity_$P_1(A_2,P_0)$ between the first person $P_0$ and an affinity plane $A_2$, wherein the affinity plane $A_2$ represents a first closeness of relationship to second person $P_1$;
data representing an association Affinity_$P_1(S_2,P_0)$ between the first person $P_0$ and a sector $S_2$, wherein the sector $S_2$ represents a first topic of interest to second person $P_1$;
data representing an association Affinity_$P_1\ (A_3,R_1)$ between a second resource $R_1$ and an affinity plane $A_3$, wherein the affinity plane $A_3$ represents a second closeness of relationship to second person $P_1$; and data representing an association Affinity_$P_1(S_3,R_1)$ between the second resource $R_1$ and a sector $S_3$, wherein the sector $S_3$ represents a second topic of interest to second person $P_1$;

wherein the method further comprises:
(10) determining whether affinity plane $A_2$ includes affinity plane $A_3$;
(11) determining whether sector $S_2$ includes sector $S_3$; and
(12) granting person $P_0$ with access to resource $R_1$ if: (a) affinity plane $A_2$ is determined to include affinity plane $A_3$; and (b) sector $S_2$ is determined to include sector $S_3$.

21. The method of claim 1:
wherein affinity plane $A_0$ is associated with an accessibility time period; and
wherein the method further comprises:
(10) before (9), determining whether a current time is within the accessibility time period associated with affinity plane $A_0$; and
wherein (9) comprises granting person $P_1$ with access to resource $R_0$ if: (a) affinity plane $A_0$ is determined to include affinity plane $A_1$; (b) sector $S_0$ is determined to include sector $S_1$; and (c) the current time is determined to be within the accessibility time period associated with affinity plane $A_0$.

22. The method of claim 1:
wherein affinity plane $A_0$ is associated with an accessibility time period; and
wherein the method further comprises:
(10) before (9), determining whether a current time is within the accessibility time period associated with affinity plane $A_0$; and
wherein (9) comprises granting person $P_1$ with access to resource $R_0$ if: (a) affinity plane $A_0$ is determined to include affinity plane $A_1$; (b) sector $S_0$ is determined to include sector $S_1$; and (c) the current time is determined to be within the accessibility time period associated with affinity plane $A_0$.

23. The method of claim 1:
wherein sector $S_0$ is associated with an accessibility time period; and
wherein the method further comprises:
(10) before (9), determining whether a current time is within the accessibility time period associated with sector $S_0$; and
wherein (9) comprises granting person $P_1$ with access to resource $R_0$ if: (a) affinity plane $A_0$ is determined to include affinity plane $A_1$; (b) sector $S_0$ is determined to include sector $S_1$; and (c) the current time is determined to be within the accessibility time period associated with sector $S_0$.

24. The method of claim 1:
wherein sector $S_1$ is associated with an accessibility time period; and
wherein the method further comprises:
(10) before (9), determining whether a current time is within the accessibility time period associated with sector $S_1$; and
wherein (9) comprises granting person $P_1$ with access to resource $R_0$ if: (a) affinity plane $A_0$ is determined to include affinity plane A; (b) sector $S_0$ is determined to include sector $S_1$; and (c) the current time is determined to be within the accessibility time period associated with sector $S_1$.

25. The method of claim 1, further comprising:
(10) identifying data associated with person $P_1$;
(11) determining whether the data associated with person $P_1$ satisfies a predetermined rule; and
(12) denying person $P_1$ access to resource $R_0$ if the data associated with person $P_1$ does not satisfy the predetermined rule.

26. The method of claim 25, wherein the data associated with person $P_1$ comprises a name of person $P_1$.

27. The method of claim 1:
wherein affinity plane $A_0$ is associated with a first weight;
wherein the system further comprises data representing an association between a third person $P_2$ and an affinity plane $A_2$, wherein the affinity plane $A_2$ is within the plurality of affinity planes associated with first person $P_0$;
wherein affinity plane $A_2$ is associated with a second weight; and
wherein the method further comprises:
(10) identifying a first distance between person $P_0$ and person $P_1$ based on the first weight; and
(11) identifying a second distance between person $P_0$ and person $P_2$ based on the second weight.

28. The method of claim 27, further comprising:
(12) rendering first graphical output representing the first distance; and
(13) rendering second graphical output representing the second distance.

29. A system comprising:
at least one computer processor;
at least one non-transitory computer-readable medium comprising computer-program instructions executable by the at least one computer processor to perform a method;
data representing a plurality of associations between a plurality of affinity planes, including an affinity plane $A_0$ and an affinity plane $A_1$, and a first person $P_0$;
data representing a plurality of associations between a plurality of sectors, including a sector $S_0$ and a sector $S_1$, and the first person $P_0$;
data representing an association Affinity_$P_0$ $(A_0,P_1)$ between an affinity plane $A_0$ and second person $P_1$, wherein the affinity plane $A_0$ represents a first closeness of relationship to person $P_0$;
data representing an association Sector_$P_0(S_0,P_1)$ between a sector $S_0$ and second person $P_1$, wherein the sector $S_0$ represents a first topic of interest to the first person $P_0$;
data representing an association Affinity_$P_0$ $(A_1,R_0)$ between an affinity plane $A_1$ and a first resource $R_0$ stored in a social networking account of the first person $P_0$ on a non-transitory computer-readable medium, wherein the affinity plane $A_1$ represents a second closeness of relationship to person $P_0$, wherein the first closeness of relationship differs from the second closeness of relationship;
data representing an association Sector_$P_0$ $(S_1,R_0)$ between a sector $S_1$ and first resource $R_0$, wherein the sector $S_1$ represents a second topic of interest to the first person $P_0$, wherein the first topic differs from the second topic;
wherein the method comprises:
(1) receiving a request to grant person $P_1$ with access to resource $R_0$;
(2) identifying, based on the request, the first person $P_0$;
(3) identifying the affinity plane $A_0$ based on the first person $P_0$, the second person $P_1$, and the data representing the association Affinity_$P_0(A_0,P_1)$;

(4) identifying the sector $S_0$ based on the first person $P_0$, the second person $P_1$, and the data representing the association Sector_$P_0$ ($S_0$, $P_1$);

(5) identifying the affinity plane $A_1$ based on the first person $P_0$, the resource $R_0$, and the data representing the association Affinity_$P_0(A_1,R_0)$;

(6) identifying the sector $S_1$ based on the first person $P_0$, the resource $R_0$, and the data representing the association Sector_$P_0(S_1,R_0)$;

(7) determining whether affinity plane $A_0$ includes affinity plane $A_1$;

(8) determining whether sector $S_0$ includes sector $S_1$; and (9) granting person $P_1$ with access to resource $R_0$ if: (a) affinity plane $A_0$ is determined to include affinity plane $A_1$; and (b) sector $S_0$ is determined to include sector $S_1$, comprising:

(9) (a) granting the request if affinity plane $A_0$ is determined to include affinity plane $A_1$ and sector $S_0$ is determined to include sector $S_1$; and (9) (b) denying the request if affinity plane $A_0$ is not determined to include affinity plane $A_1$ or sector $S_0$ is not determined to include sector $S_1$.

30. The system of claim 29, wherein the request comprises a request specifying resource $R_0$.

31. The system of claim 29, wherein the request comprises a request to access a plurality of resources including resource $R_0$.

32. The system of claim 31, wherein the request comprises a request to access an affinity plane containing resource $R_0$.

33. The system of claim 31, wherein the request comprises a request to access a sector containing resource $R_0$.

34. The system of claim 29, wherein the first affinity plane contains the second affinity plane.

35. The system of claim 29, wherein the affinity plane $A_0$ contains the affinity plane $A_1$.

36. The system of claim 29, wherein the affinity plane $A_0$ and the affinity plane $A_1$ are disjoint.

37. The system of claim 18, wherein the sector $S_0$ contains the sector $S_1$.

38. The system of claim 29, wherein the sector $S_0$ contains some but not all of the sector $S_1$.

39. The system of claim 29, wherein the sector $S_0$ and the sector $S_1$ are disjoint.

40. The system of claim 29:
wherein the data representing the association between the second person $P_1$ and the affinity plane $A_0$ comprises data representing an association between the second person $P_1$ and affinity planes $A_0$ and $A_2$, wherein affinity plane $A_2$ is within the plurality of affinity planes associated with first person $P_0$;
wherein (7) comprises determining whether affinity planes $A_0$ and/or $A_2$ include affinity plane $A_1$; and
wherein (9) comprises granting person $P_1$ with access to resource $R_0$ if: (a) affinity plane $A_0$ and/or $A_2$ is determined to include affinity plane $A_1$; and (b) sector $S_0$ is determined to include sector $S_1$.

41. The system of claim 29:
wherein the data representing the association between the second person $P_1$ and the sector $S_0$ comprises data representing an association between the second person $P_1$ and sectors $S_0$ and $S_2$, wherein sector $S_2$ is within the plurality of sectors associated with first person $P_0$;
wherein (8) comprises determining whether sectors $S_0$ and/or $S_2$ include sector $S_1$; and
wherein (9) comprises granting person $P_1$ with access to resource $R_0$ if: (a) affinity plane $A_0$ is determined to include affinity plane $A_1$; and (b) sector $S_0$ and/or $S_2$ is determined to include sector $S_1$.

42. The system of claim 29:
wherein the data representing the association between the first resource $R_0$ and the affinity plane $A_1$ comprises data representing an association between first resource $R_0$ and affinity planes $A_1$ and $A_2$, wherein affinity plane $A_2$ is within the plurality of affinity planes associated with first person $P_0$;
wherein (7) comprises determining whether affinity plane $A_0$ includes affinity planes $A_1$ and/or $A_2$; and
wherein (9) comprises granting person $P_1$ with access to resource $R_0$ if: (a) affinity plane $A_0$ is determined to include affinity planes $A_1$ and/or $A_2$; and (b) sector $S_0$ is determined to include sector $S_1$.

43. The system of claim 29:
wherein the data representing the association between the first resource $R_0$ and the sector $S_1$ comprises data representing an association between first resource $R_0$ associated with sectors $S_1$ and $S_2$, wherein sector $S_2$ is within the plurality of sectors associated with first person $P_0$;
wherein (8) comprises determining whether sector $S_0$ includes sectors $S_1$ and/or $S_2$; and
wherein (9) comprises granting person B with access to resource $R_0$ if: (a) affinity plane $A_0$ is determined to include affinity plane $A_1$; and (b) sector $S_0$ is determined to include sectors $S_1$ and/or $S_2$.

44. The system of claim 29, wherein the system further comprises:
data representing an association Affinity_$P_0(A_3,P_2)$ between an affinity plane $A_2$ and a third person $P_3$, wherein affinity plane $A_2$ is identical to affinity plane $A_0$.

45. The system of claim 29, wherein the system further comprises:
data representing an association Affinity_$P_0(A_2,R_1)$ between an affinity plane $A_2$ and a second resource $R_1$, wherein affinity plane $A_2$ is identical to affinity plane $A_1$.

46. The system of claim 29, wherein the system further comprising:
data representing an association Sector_$P_0(S_2,P_2)$ between a sector $S_2$ and a third person $P_2$, wherein sector $S_2$ is identical to sector $S_0$.

47. The system of claim 29, wherein the system further comprises:
data representing an association Sector_$P_0(S_2,R_1)$ between a sector $S_2$ and a second resource $R_1$, wherein sector $S_2$ is identical to sector $S_1$.

48. The system of claim 29, wherein the system further comprises:
plurality of associations between a plurality of affinity planes and the second person $P_1$;
data representing a plurality of associations between a plurality of sectors and the second person $P_1$;
data representing an association Affinity_$P_1(A_2,P_0)$ between the first person $P_0$ and an affinity plane $A_2$, wherein the affinity plane $A_2$ represents a first closeness of relationship to second person $P_1$;
data representing an association Affinity_$P_1(S_2,P_0)$ between the first person $P_0$ and a sector $S_2$, wherein the sector $S_2$ represents a first topic of interest to second person $P_1$;
data representing an association Affinity_$P_1(A_3,R_1)$ between a second resource $R_1$ and an affinity plane $A_3$, wherein the affinity plane $A_3$ represents a second closeness of relationship to second person $P_1$; and data representing an association Affinity_$P_1$($S_3$,$R_1$) between the second resource $R_1$ and a sector $S_3$, wherein the sector $S_3$ represents a second topic of interest to second person $P_1$;

wherein the method further comprises:
- (10) determining whether affinity plane $A_2$ includes affinity plane $A_3$;
- (11) determining whether sector $S_2$ includes sector $S_3$; and
- (12) granting person $P_0$ with access to resource $R_1$ if: (a) affinity plane $A_2$ is determined to include affinity plane $A_3$; and (b) sector $S_2$ is determined to include sector $S_3$.

49. The system of claim 29:

wherein affinity plane $A_0$ is associated with an accessibility time period; and wherein the method further comprises:
- (10) before (9), determining whether a current time is within the accessibility time period associated with affinity plane $A_0$; and wherein (9) comprises granting person $P_1$ with access to resource $R_0$ if: (a) affinity plane $A_0$ is determined to include affinity plane $A_1$; (b) sector $S_0$ is determined to include sector $S_1$; and (c) the current time is determined to be within the accessibility time period associated with affinity plane $A_0$.

50. The system of claim 29:

wherein affinity plane $A_0$ is associated with an accessibility time period; and wherein the method further comprises:
- (10) before (9), determining whether a current time is within the accessibility time period associated with affinity plane $A_0$; and wherein (9) comprises granting person $P_1$ with access to resource $R_0$ if: (a) affinity plane $A_0$ is determined to include affinity plane $A_1$; (b) sector $S_0$ is determined to include sector $S_1$; and (c) the current time is determined to be within the accessibility time period associated with affinity plane $A_0$.

51. The system of claim 29:

wherein sector $S_0$ is associated with an accessibility time period; and wherein the method further comprises:
- (10) before (9), determining whether a current time is within the accessibility time period associated with sector $S_0$; and wherein (9) comprises granting person $P_1$ with access to resource $R_0$ if: (a) affinity plane $A_0$ is determined to include affinity plane $A_1$; (b) sector $S_0$ is determined to include sector $S_1$; and (c) the current time is determined to be within the accessibility time period associated with sector $S_0$.

52. The system of claim 29:

wherein sector $S_1$ is associated with an accessibility time period; and wherein the method further comprises:
- (10) before (9), determining whether a current time is within the accessibility time period associated with sector $S_1$; and wherein (9) comprises granting person $P_1$ with access to resource $R_0$ if: (a) affinity plane $A_0$ is determined to include affinity plane A; (b) sector $S_0$ is determined to include sector $S_1$; and (c) the current time is determined to be within the accessibility time period associated with sector $S_1$.

53. The system of claim 29, wherein the method further comprises:
- (10) identifying data associated with person $P_1$;
- (11) determining whether the data associated with person $P_1$ satisfies a predetermined rule; and
- (12) denying person $P_1$ access to resource $R_0$ if the data associated with person $P_1$ does not satisfy the predetermined rule.

54. The system of claim 53, wherein the data associated with person $P_1$ comprises a name of person $P_1$.

55. The system of claim 29:

wherein affinity plane $A_0$ is associated with a first weight;

wherein the system further comprises data representing an association between a third person $P_2$ and an affinity plane $A_2$, wherein the affinity plane $A_2$ is within the plurality of affinity planes associated with first person $P_0$;

wherein affinity plane $A_2$ is associated with a second weight; and wherein the method further comprises:
- (10) identifying a first distance between person $P_0$ and person $P_1$ based on the first weight; and
- (11) identifying a second distance between person $P_0$ and person $P_2$ based on the second weight.

56. The system of claim 55, wherein the method further comprises:
- (12) rendering first graphical output representing the first distance; and
- (13) rendering second graphical output representing the second distance.

57. A method for use with a system, wherein the method is performed by at least one computer processor executing computer program instructions stored on at least one non-transitory computer-readable medium, the system comprising:

data representing a plurality of associations between a plurality of affinity planes, including an affinity plane $A_0$ and an affinity plane $A_1$, and a first person $P_0$;

data representing a plurality of associations between a plurality of sectors, including a sector $S_0$ and a sector $S_1$, and the first person $P_0$;

data representing an association Sector_$P_0$($S_0$,$P_1$) between a sector $S_0$ and second person $P_1$, wherein the sector $S_0$ represents a first topic of interest to the first person $P_0$;

data representing an association Affinity_$P_0$ ($A_1$,$R_0$) between an affinity plane $A_1$ and a first resource $R_0$, wherein the affinity plane $A_1$ represents a first closeness of relationship to the first person $P_0$;

data representing an association Sector_$P_0$ ($S_1$,$R_0$) between a sector $S_1$ and first resource $R_0$ stored in a social networking account of the first person $P_0$ on a non-transitory computer-readable medium, wherein the sector $S_1$ represents a second topic of interest to the first person $P_0$, wherein the first topic of interest differs from the second topic of interest;

wherein the method comprises:
- (1) receiving a request to grant person $P_1$ with access to resource $R_0$;
- (2) identifying, based on the request, the first person $P_0$;
- (3) identifying the sector $S_0$ based on the first person $P_0$, the second person $P_1$, and the data representing the association Sector_$P_0$ ($S_0$, $P_1$);
- (4) identifying the sector $S_1$ based on the first person $P_0$, the resource $R_0$, and the data representing the association Sector_$P_0$($S_1$,$R_0$);
- (5) determining whether sector $S_0$ includes sector $S_1$; and
- (6) granting person $P_1$ with access to resource $R_0$ if: sector $S_0$ is determined to include sector $S_1$, comprising:

(7) (a) granting the request if sector $S_0$ is determined to include sector $S_1$; and
(7) (b) denying the request if sector $S_0$ is not determined to include sector $S_1$.

58. A system comprising:
at least one computer processor;
at least one non-transitory computer-readable medium comprising computer-program instructions executable by the at least one computer processor to perform a method;
data representing a plurality of associations between a plurality of affinity planes, including an affinity plane $A_0$ and an affinity plane $A_1$, and a first person $P_0$;
data representing a plurality of associations between a plurality of sectors, including a sector $S_0$ and a sector $S_1$, and the first person $P_0$;
data representing an association Sector_$P_0$($S_0,P_1$) between a sector $S_0$ and second person $P_1$, wherein the sector $S_0$ represents a first topic of interest to the first person $P_0$;
data representing an association Affinity_$P_0$ ($A_1,R_0$) between an affinity plane $A_1$ and a first resource $R_0$, wherein the affinity plane $A_1$ represents a first closeness of relationship to the first person $P_0$;
data representing an association Sector_$P_0$ ($S_1,R_0$) between a sector $S_1$ and first resource $R_0$ stored in a social networking account of the first person $P_0$ on a non-transitory computer-readable medium, wherein the sector $S_1$ represents a second topic of interest to the first person $P_0$, wherein the first topic of interest differs from the second topic of interest;
wherein the method comprises:
(1) receiving a request to grant person $P_1$ with access to resource $R_0$;
(2) identifying, based on the request, the first person $P_0$;
(3) identifying the sector $S_0$ based on the first person $P_0$, the second person $P_1$, and the data representing the association Sector_$P_0$ ($S_0, P_1$);
(4) identifying the sector $S_1$ based on the first person $P_0$, the resource $R_0$, and the data representing the association Sector_$P_0$($S_1,R_0$);
(5) determining whether sector $S_0$ includes sector $S_1$; and
(26) granting person $P_1$ with access to resource $R_0$ if: sector $S_0$ is determined to include sector $S_1$, comprising:
(6) (a) granting the request if sector $S_0$ is determined to include sector $S_1$; and
(6) (b) denying the request if sector $S_0$ is not determined to include sector $S_1$.

59. A method for use with a system, wherein the method is performed by at least one computer processor executing computer program instructions stored on at least one non-transitory computer-readable medium, the system comprising:
data representing a plurality of associations between a plurality of affinity planes, including an affinity plane $A_0$ and an affinity plane $A_1$, and a first person $P_0$;
data representing a plurality of associations between a plurality of sectors, including a sector $S_0$ and a sector $S_1$, and the first person $P_0$;
data representing an association Affinity_$P_0$ ($A_0,P_1$) between an affinity plane $A_0$ and second person $P_1$, wherein the affinity plane $A_0$ represents a first closeness of relationship to person $P_0$;
data representing an association Affinity_$P_0$ ($A_1,R_0$) between an affinity plane $A_1$ and a first resource $R_0$ stored in a social networking account of the first person $P_0$ on a non-transitory computer-readable medium, wherein the affinity plane $A_1$ represents a second closeness of relationship to person $P_0$, wherein the first closeness of relationship differs from the second closeness of relationship;
data representing an association Sector_$P_0$ ($S_1,R_0$) between a sector $S_1$ and first resource $R_0$, wherein the sector $S_1$ represents a second topic of interest to the first person $P_0$, wherein the first topic differs from the second topic;
wherein the method comprises:
(1) receiving a request to grant person $P_1$ with access to resource $R_0$;
(2) identifying, based on the request, the first person $P_0$;
(3) identifying the affinity plane $A_0$ based on the first person $P_0$, the second person $P_1$, and the data representing the association Affinity_$P_0$($A_0,P_1$);
(4) identifying the affinity plane $A_1$ based on the first person $P_0$, the resource $R_0$, and the data representing the association Affinity_$P_0$($A_1,R_0$);
(5) identifying the sector $S_1$ based on the first person $P_0$, the resource $R_0$, and the data representing the association Sector_$P_0$($S_1,R_0$);
(6) determining whether affinity plane $A_0$ includes affinity plane $A_1$; and
(7) granting person $P_1$ with access to resource $R_0$ if affinity plane $A_0$ is determined to include affinity plane $A_1$, comprising:
(7) (a) granting the request if affinity plane $A_0$ is determined to include affinity plane $A_1$; and
(7) (b) denying the request if affinity plane $A_0$ is not determined to include affinity plane $A_1$.

60. A system comprising:
at least one computer processor;
data representing a plurality of associations between a plurality of affinity planes, including an affinity plane $A_0$ and an affinity plane $A_1$, and a first person $P_0$;
data representing a plurality of associations between a plurality of sectors, including a sector $S_0$ and a sector $S_1$, and the first person $P_0$;
data representing an association Affinity_$P_0$ ($A_0,P_1$) between an affinity plane $A_0$ and second person $P_1$, wherein the affinity plane $A_0$ represents a first closeness of relationship to person $P_0$;
data representing an association Affinity_$P_0$ ($A_1,R_0$) between an affinity plane $A_1$ and a first resource $R_0$ stored in a social networking account of the first person $P_0$ on a non-transitory computer-readable medium, wherein the affinity plane $A_1$ represents a second closeness of relationship to person $P_0$, wherein the first closeness of relationship differs from the second closeness of relationship;
data representing an association Sector_$P_0$ ($S_1,R_0$) between a sector $S_1$ and first resource $R_0$, wherein the sector $S_1$ represents a second topic of interest to the first person $P_0$, wherein the first topic differs from the second topic;
wherein the method comprises:
(1) receiving a request to grant person $P_1$ with access to resource $R_0$;
(2) identifying, based on the request, the first person $P_0$;
(3) identifying the affinity plane $A_0$ based on the first person $P_0$, the second person $P_1$, and the data representing the association Affinity_$P_0$($A_0,P_1$);
(4) identifying the affinity plane $A_1$ based on the first person $P_0$, the resource $R_0$, and the data representing the association Affinity_$P_0$($A_1,R_0$);

(5) identifying the sector $S_1$ based on the first person $P_0$, the resource $R_0$, and the data representing the association Sector_$P_0$($S_1$,$R_0$);

(6) determining whether affinity plane $A_0$ includes affinity plane $A_1$; and (7) granting person $P_1$ with access to resource $R_0$ if affinity plane $A_0$ is determined to include affinity plane $A_1$, comprising:

(7) (a) granting the request if affinity plane $A_0$ is determined to include affinity plane $A_1$; and (7) (b) denying the request if affinity plane $A_0$ is not determined to include affinity plane $A_1$.

61. A method for use with a system, wherein the method is performed by at least one computer processor executing computer program instructions stored on at least one non-transitory computer-readable medium, the system comprising:

data representing a plurality of associations between a plurality of affinity planes, including an affinity plane $A_0$ and an affinity plane $A_1$, and a first person $P_0$;

data representing a plurality of associations between a plurality of sectors, including a sector $S_0$ and a sector $S_1$, and the first person $P_0$;

data representing an association Affinity_$P_0$ ($A_0$,$P_1$) between an affinity plane $A_0$ and second person $P_1$, wherein the affinity plane $A_0$ represents a first closeness of relationship to person $P_0$;

data representing an association Sector_$P_0$($S_0$,$P_1$) between a sector $S_0$ and second person $P_1$, wherein the sector $S_0$ represents a first topic of interest to the first person $P_0$;

data representing an association Affinity_$P_0$ ($A_1$,$R_0$) between an affinity plane $A_1$ and a first resource $R_0$ stored in a social networking account of the first person $P_0$ on a non-transitory computer-readable medium, wherein the affinity plane $A_1$ represents a second closeness of relationship to person $P_0$, wherein the first closeness of relationship differs from the second closeness of relationship;

wherein the method comprises:

(1) receiving a request to grant person $P_1$ with access to resource $R_0$;

(2) identifying, based on the request, the first person $P_0$;

(3) identifying the affinity plane $A_0$ based on the first person $P_0$, the second person $P_1$, and the data representing the association Affinity_$P_0$($A_0$,$P_1$);

(4) identifying the affinity plane $A_1$ based on the first person $P_0$, the resource $R_0$, and the data representing the association Affinity_$P_0$($A_1$,$R_0$);

(5) identifying the sector $S_1$ based on the first person $P_0$, the resource $R_0$, and the data representing the association Sector_$P_0$($S_1$,$R_0$);

(6) determining whether affinity plane $A_0$ includes affinity plane $A_1$; and (7) granting person $P_1$ with access to resource $R_0$ if affinity plane $A_0$ is determined to include affinity plane $A_1$, comprising:

(7) (a) granting the request if affinity plane $A_0$ is determined to include affinity plane $A_1$; and (7) (b) denying the request if affinity plane $A_0$ is not determined to include affinity plane $A_1$.

62. A system comprising:

at least one computer processor;

data representing a plurality of associations between a plurality of affinity planes, including an affinity plane $A_0$ and an affinity plane $A_1$, and a first person $P_0$;

data representing a plurality of associations between a plurality of sectors, including a sector $S_0$ and a sector $S_1$, and the first person $P_0$;

data representing an association Affinity_$P_0$ ($A_0$,$P_1$) between an affinity plane $A_0$ and second person $P_1$, wherein the affinity plane $A_0$ represents a first closeness of relationship to person $P_0$;

data representing an association Sector_$P_0$($S_0$,$P_1$) between a sector $S_0$ and second person $P_1$, wherein the sector $S_0$ represents a first topic of interest to the first person $P_0$;

data representing an association Affinity_$P_0$ ($A_1$,$R_0$) between an affinity plane $A_1$ and a first resource $R_0$ stored in a social networking account of the first person $P_0$ on a non-transitory computer-readable medium, wherein the affinity plane $A_1$ represents a second closeness of relationship to person $P_0$, wherein the first closeness of relationship differs from the second closeness of relationship;

wherein the method comprises:

(1) receiving a request to grant person $P_1$ with access to resource $R_0$;

(2) identifying, based on the request, the first person $P_0$;

(3) identifying the affinity plane $A_0$ based on the first person $P_0$, the second person $P_1$, and the data representing the association Affinity_$P_0$($A_0$,$P_1$);

(4) identifying the affinity plane $A_1$ based on the first person $P_0$, the resource $R_0$, and the data representing the association Affinity_$P_0$($A_1$,$R_0$);

(5) identifying the sector $S_1$ based on the first person $P_0$, the resource $R_0$, and the data representing the association Sector_$P_0$($S_1$,$R_0$);

(6) determining whether affinity plane $A_0$ includes affinity plane $A_1$; and (7) granting person $P_1$ with access to resource $R_0$ if affinity plane $A_0$ is determined to include affinity plane $A_1$, comprising:

(7) (a) granting the request if affinity plane $A_0$ is determined to include affinity plane $A_1$; and (7) (b) denying the request if affinity plane $A_0$ is not determined to include affinity plane $A_1$.

* * * * *